United States Patent
Lorca Hernando

(10) Patent No.: US 9,780,915 B2
(45) Date of Patent: Oct. 3, 2017

(54) METHOD AND SYSTEM OF CYCLIC PREFIX OVERHEAD REDUCTION FOR ENABLING CANCELLATION OF INTER-SYMBOL AND INTER-CARRIER INTERFERENCES IN OFDM WIRELESS COMMUNICATION NETWORKS

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 57 days.

(21) Appl. No.: 14/872,217

(22) Filed: Oct. 1, 2015

(65) Prior Publication Data

US 2016/0099824 A1    Apr. 7, 2016

(30) Foreign Application Priority Data

Oct. 1, 2014    (EP) ..................... 14382377

(51) Int. Cl.
| | | |
|---|---|---|
| *H04W 4/00* | (2009.01) | |
| *H04L 1/00* | (2006.01) | |
| *H04L 5/00* | (2006.01) | |
| *H04W 72/04* | (2009.01) | |
| *H04L 27/26* | (2006.01) | |

(52) U.S. Cl.
CPC .......... *H04L 1/0048* (2013.01); *H04L 5/0007* (2013.01); *H04L 5/0048* (2013.01); *H04L 27/2607* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,606,138 B2 | 10/2009 | Wang et al. | |
| 2009/0122771 A1 | 5/2009 | Cai | |
| 2010/0110874 A1* | 5/2010 | Kang .............. | H04L 27/2602 370/208 |
| 2010/0111014 A1* | 5/2010 | Kang .............. | H04W 72/1268 370/329 |
| 2010/0226415 A1* | 9/2010 | Mehta .............. | H04L 1/0625 375/219 |

OTHER PUBLICATIONS

European Search Report for corresponding EP Application No. 14382377.1, dated May 7, 2015.
Mohammad Ghanbarisabagh, et al. "Cyclic Prefix Reduction for 20.48 Gb/s Direct-Detection Optical OFDM Transmission over 2560 Km of SSMF," International Journal of Communication Systems, vol. 24, No. 11, pp. 1407-1410 (Jan. 19, 2011).
Eeva Lahetkangas, et al. "Achieving low latency and energy consumption by 5G TDD mode optimization," ICC 2014—W8: Workshop on 5G Technologies, pp. 1-6 (Jun. 10, 2014).

(Continued)

*Primary Examiner* — Bob Phunkulh
(74) *Attorney, Agent, or Firm* — Gardner, Linn, Burkhart & Flory, LLP

(57) ABSTRACT

A system and method are provided for reducing the overhead caused by the presence of the cyclic prefix while enabling inter-carrier interference (ICI) and inter-symbol interference (ISI) cancellation in an Orthogonal Frequency Division Multiplexing (OFDM) network that includes an OFDM transmitter and an OFDM receiver.

16 Claims, 10 Drawing Sheets

(56) References Cited

OTHER PUBLICATIONS

Gilberto Berardinelli, et al. "Zero-tail DFT-spread-OFDM signals," Proceedings of the 2013 IEEE Global Communications Conference (2013).
Carlos Prieto del Arno, et al. "Suppression of Cyclic Prefix in Down-Link LTE like Systems to Increase Capacity," Proceedings of the 2013 IEEE Vehicular Technology Conference (2013).
Dukhyun Kim, et al. "Residual ISI Cancellation for OFDM with Applications to HDTV Broadcasting." IEEE Journal on Selected Areas in Communications, vol. 16, No. 8, pp. 1590-1599 (1998).

\* cited by examiner

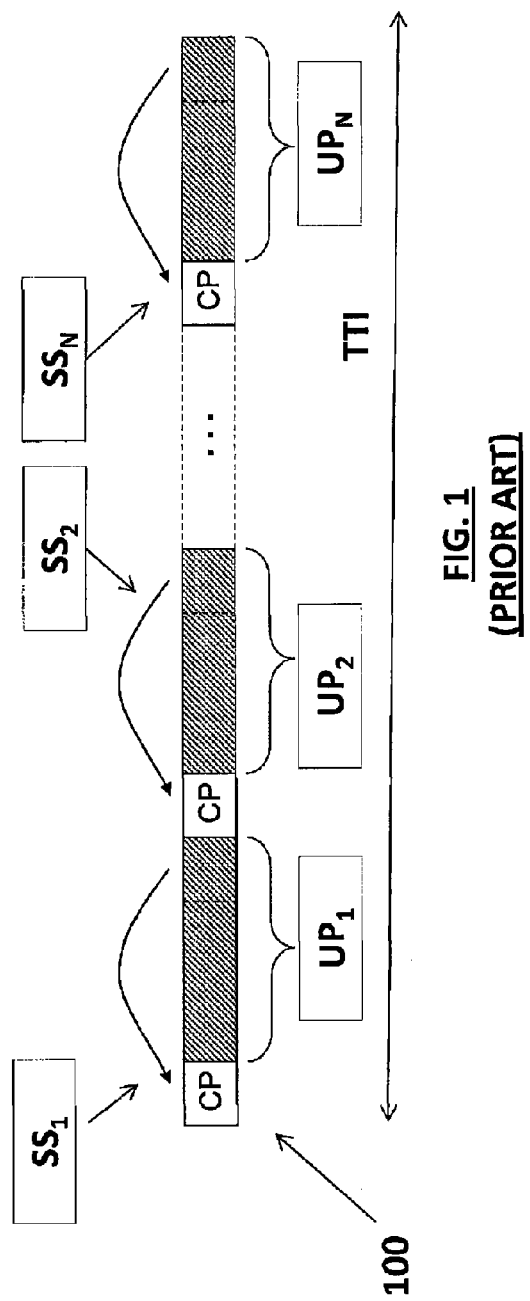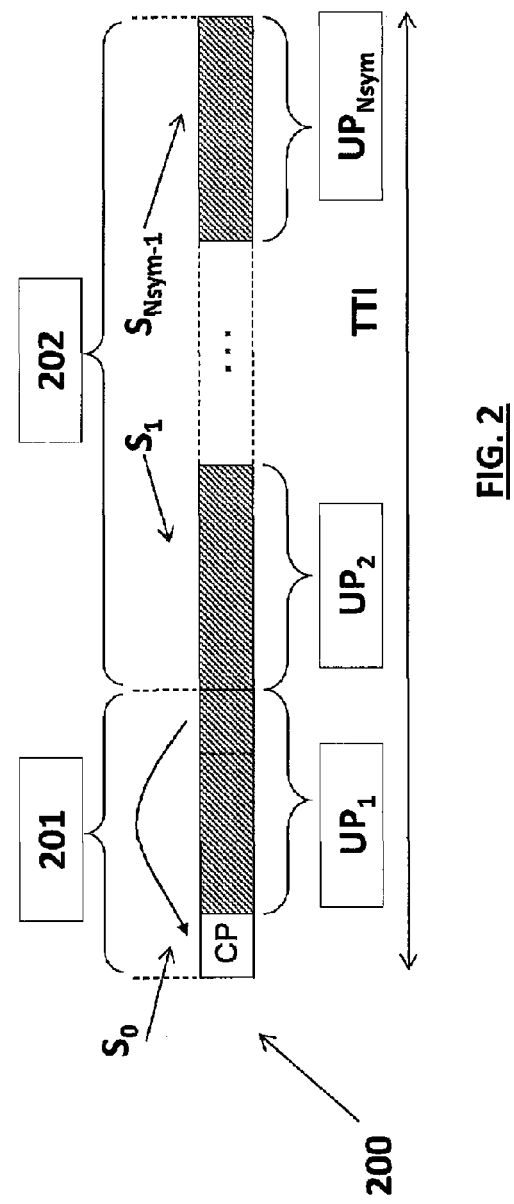

METHOD AND SYSTEM OF CYCLIC PREFIX OVERHEAD REDUCTION FOR ENABLING CANCELLATION OF INTER-SYMBOL AND INTER-CARRIER INTERFERENCES IN OFDM WIRELESS COMMUNICATION NETWORKS

FIELD OF THE INVENTION

The present invention has its application within the telecommunication sector, especially, deals with the field of interference cancellation in Orthogonal Frequency-Division Multiple Access (OFDMA) wireless communication systems.

BACKGROUND OF THE INVENTION

Orthogonal Frequency-Division Multiple Access (OFDMA) is a proven access technique for efficient user and data multiplexing in the frequency domain. One example of a system employing Orthogonal Frequency Division Multiplexing (OFDM) is Long-Term Evolution (LTE). LTE is the next step in cellular Third-Generation (3G) systems, which represents basically an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. Other wireless standards like WiFi (IEEE 802.11) or WiMAX (IEEE 802.16) also employ OFDM.

OFDM wireless systems transmit a sequence of OFDM symbols that comprise a time transmission interval (TTI).

One advantage of OFDM is the ability to perform frequency-domain equalization of the symbols, which may be performed easily in real time with the use of Fast Fourier Transforms (FFT). However, an open issue in OFDM is how to deal with inter-symbol interference (ISI) and inter-carrier interference (ICI) in an efficient way without impacting the frequency-domain equalization capabilities that make it so attractive. The most common way to deal with ISI and ICI is to reserve a number of samples at the beginning of every symbol containing a repetition of the latest part of the symbol, in order to preserve the cyclicity of the signal and absorb the echoes caused by multipath. The cyclic prefix (CP) does not contain any useful information and hence introduces a loss in efficiency which becomes more important when the symbol length is reduced.

Existing techniques add this cyclic prefix at the beginning of every OFDM symbol. The Cyclic Prefix (CP) must be added to each OFDM Symbol before transmission to accommodate the time spread of the OFDM subcarriers due to fibre dispersion. The CP ensures that the subcarriers remain periodic within the receiver's Fourier Transfer window, to eliminate Inter-Carrier Interference (ICI), caused by phase discontinuities within a window. The CP adds an overhead to the transmission, requiring additional optical bandwidth and reducing receiver sensitivity.

The first OFDM symbol in the TTI usually contains critical control information for the successful decoding of the rest of the symbols, such as scheduling information, pilots for channel estimation and other important control data. Reliable decoding of this first symbol is therefore critical, and a dedicated cyclic prefix appended to the beginning of this first symbol should not be avoided in order to absorb the echoes caused by the channel up to a given maximum delay spread, hence allowing for easy detection.

The current trend in wireless mobile communications is to reduce the end-to-end latencies so as to make the overall system more responsive, and this in general implies a reduction in the symbol duration.

Latency reductions in OFDM directly translate into reductions in the OFDM symbol lengths. The cyclic prefix must be wide enough so as to accommodate the largest delay spread encountered in the scenario, and this puts a lower limit to the size of the CP. Hence, if the symbol length is significantly reduced, the overhead caused by the CP might be unacceptable.

There are alternatives to the use of cyclic prefix (CP) based on the insertion of a number of zeros at the beginning and the end of the information in order to absorb ISI ("Zero-tail DFT-spread-OFDM signals", G. Berardinelli et al., Proceedings of the 2013 IEEE Global Communications Conference, 2013), but they are only applicable to DFT-spread-OFDM (DFT-s-OFDM).

Other solutions involve estimating the channel impulse response and trying to cancel ISI with an iterative method ("Suppression of Cyclic Prefix in Down-Link LTE like Systems to Increase Capacity", C. del Amo and M. Fernández-Getino, Proceedings of the 2013 IEEE Vehicular Technology Conference, 2013), but they rely on complex channel estimation procedures that must be linked to the actual ISI interference cancellation algorithms.

Another prior-art solution ("Residual ISI cancellation for OFDM with applications to HDTV Broadcasting", D. Kim et al., IEEE J. Sel. Areas in Comm., vol 16 (8), 1998) cancels ISI and ICI through an iterative process over all the OFDM symbols, therefore yielding high complexity and also relying on training sequences for channel estimation in the time domain. These training sequences would not be applicable in systems like e.g. LTE, where pilot signals are used instead for channel estimation in the frequency domain.

Another example of existing approaches is described in U.S. Pat. No. 7,606,138, which proposes a particular arrangement of OFDM symbols into a frame by inserting a single cyclic prefix prior to it, thereby increasing spectral efficiency. However the decoding procedure involves multiple direct and inverse Fourier transforms to recover the original samples, as well as complex channel estimation and frequency offset detection procedures. Such procedures rely on particular time-domain training sequences embedded in the signal, and may not be applicable to systems like e.g. LTE where frequency-domain pilots are devoted to channel estimation, or at least involve greater computational complexity at the receiver.

Therefore, there is a need in the state of the art for more efficient ways of dealing with ISI and ICI in OFDM which enable significant symbol reductions in wireless communication systems without compromising the overall efficiency of the system.

SUMMARY OF THE INVENTION

According to aspects of the present invention, a system and a method are provided for cancelling inter-symbol interference (ISI) and inter-carrier interference (ICI) in Orthogonal Frequency-Division Multiplexing (OFDM) networks (e.g., in Long-Term Evolution, LTE, networks) while reducing the overhead due to the OFDM cyclic prefix (CP).

The present invention reduces the overhead which is caused by the presence of the cyclic prefix in time-domain signal waveforms for OFDM wireless communications. Thus, the present invention allows the cancellation of inter-symbol and inter-carrier interferences in a simpler way compared to prior art.

In the context of this invention, a time transmission interval (TTI) is the fundamental minimum time interval where information to/from a given user is to be sent/received in OFDM wireless systems, and in practice TTI corresponds to a pre-defined time interval specific to each technology (e.g., in LTE the TTI corresponds to 1 ms).

The present invention introduces a change in the way that a sequence of OFDM symbols comprising a TTI is transmitted (and received) in OFDM wireless network. More particularly, this invention proposes to remove the cyclic prefix from OFDM symbols other than the first one in the TTI, thus increasing efficiency compared to prior art.

At the transmitter side, the present invention generates a time-domain signal wherein:

The first part of the TTI comprises the first OFDM symbol and its associated CP. The time-domain samples of the first symbol (excluding the CP) are obtained, as in prior art techniques, by means of an inverse Fast Fourier Transform (FFT) of the complex subcarriers that carry the information, with a length equal to one OFDM symbol.

The time-domain samples of said first OFDM symbol are concatenated with a second part of the TTI. The (remaining) samples of the second part are obtained by means of a longer, inverse FFT of the concatenated subcarriers in the frequency domain that comprise the original OFDM symbols in prior art, as if they comprised a larger equivalent OFDM symbol. This second part of the TTI does not have any appended CP, so efficiency can be increased.

The whole concatenation of time-domain samples comprises the TTI in the time domain.

The larger equivalent OFDM symbol results in lower frequency diversity.

Therefore, in a possible embodiment of the invention, an additional interleaver of the encoded bits is also proposed prior to mapping to subcarriers in the frequency domain. This interleaver improves frequency diversity by avoiding that adjacent bits undergo very similar channel responses.

The subcarriers in the frequency domain of the second part of the TTI have a number of pilot symbols for channel estimation which are arranged in a special way compared to prior art techniques. Pilot subcarriers cover the whole system bandwidth over the "enlarged" symbol obtained by concatenating the subcarriers in the second part, also taking into account the minimum channel coherence bandwidth to be supported. In a possible embodiment of the invention, appropriate guard bands are also provided before and after the set of non-null modulated subcarriers for the second part of the TTI, thus preventing leakage of the OFDM signals to adjacent bands.

The proposed TTI structure has several implications. On one hand it allows for proper detection of the first OFDM symbol as well as channel estimation in the time and frequency domains thanks to the CP. On the other hand, with the aid of the first decoded symbol it is possible to cancel inter-symbol interference (ISI) and inter-carrier interference (ICI) for the remaining part of the TTI even in the absence of CP in that part. Additionally, detection and ICI cancellation for this second part can be more efficiently performed for the whole block of samples instead of having to operate on a symbol-by-symbol basis as in prior art techniques, without compromising the maximum supported carrier frequency offset. The modified transmission structure for the second part of the TTI is a more convenient way to process information in order to ease detection and reduce the complexity of the ISI and ICI cancellation algorithm, only relying on channel estimation at the first OFDM symbol which benefits from ideally perfect estimation thanks to the CP.

At the receiver side, the present invention can cancel Inter-symbol interference (ISI) and inter-carrier interference (ICI) by means of the following procedure:

a) ISI-free and ICI-free detection of the first OFDM symbol leads to proper decoding of control information as well as channel estimation, therefore both the channel frequency response and the channel impulse response can be estimated at this symbol.

b) From the channel impulse response the receiver can extract the significant multipath components of the channel by identifying the most significant peaks and detecting their associated amplitudes, phases and delays.

c) The receiver performs channel equalization in the whole system bandwidth, and not only in the subcarriers scheduled for the user, in order to recover the information contained in all the subcarriers of the first OFDM symbol. Subsequent decoding and inverse Fourier transformation enables recovery of the original transmitted time-domain samples of the first OFDM symbol (excluding the cyclic prefix).

d) With the aid of the multipath components identified in the channel impulse response, the receiver can reconstruct the replicas of the first OFDM symbol that enter into the second part of the TTI in the form of ISI. The receiver can then subtract these components from the time-domain samples of the second part, effectively removing ISI.

e) ICI also appears in the second part of the TTI due to the effects of multipath and the associated loss of cyclicity. An algorithm is proposed that reconstructs the echoes that would have entered into the beginning of the second part of the TTI if a proper CP had been employed. In contrast to prior art techniques, the proposed algorithm considers the remaining samples as a whole and restores the cyclicity for the whole part instead of dealing with ICI for each of the OFDM symbols in a serial way, therefore reducing complexity.

f) A de-interleaver operation is also applied that restores the original encoded samples and compensates for the loss in frequency diversity created by the enlarged FFT in the second part of the TTI.

g) After application of the above procedure, the original information contained in the TTI can be recovered after Forward Error Correction (FEC) decoding.

According to a first aspect of the present invention, a method of cyclic prefix overhead reduction for enabling inter-symbol interference (ISI) and inter-carrier interference (ICI) cancellation in OFDM networks is disclosed and comprises the following steps for reducing the overhead caused by the presence of the cyclic prefix in OFDM wireless networks (the OFDM wireless network comprising one OFDM transmitter, one OFDM receiver and a wireless channel, said OFDM transmitter willing to send information to said OFDM receiver in the form of a set of time-domain complex samples denoted as Time Transmission Interval or TTI, said TTI comprising a number of OFDM symbols denoted by $N_{sym}$):

At the transmitter side, generating a time-domain signal comprising:
- a first part of the TTI comprising the first OFDM symbol obtained in the time domain through an inverse Fourier transform of the complex information symbols to be carried by a number of subcarriers in the frequency domain, said inverse Fourier transform having a length equal to said number of subcarriers and denoted by $N_{OFDM}$, said subcarriers comprising both data subcarriers and pilot subcarriers for channel estimation;
- a cyclic prefix appended to the beginning of said first OFDM symbol containing a replica of the last samples of said first OFDM symbol, with a length given by the largest expected delay spread of said wireless channel;
- a Forward Error Correction encoding operation of the information bits to be transmitted, followed by a pseudo-random interleaving operation prior to mapping the encoded bits to time-frequency resources in order to avoid that adjacent bits are mapped to adjacent subcarriers in the frequency domain;
- a set of $(N_{sym}-1) \cdot N_{OFDM}$ complex subcarriers in the frequency domain that correspond to the information to be transmitted in a second part of the TTI, comprising the concatenation of the subcarriers corresponding to the remaining $(N_{sym}-1)$ OFDM symbols of the TTI, said subcarriers comprising both data subcarriers and pilot subcarriers for channel estimation;
- an inverse Fourier transform with length $(N_{sym}-1) \cdot N_{OFDM}$ of said concatenated set of subcarriers, that yield the $(N_{sym}-1) \cdot N_{OFDM}$ time-domain complex samples to be transmitted in the second part of the TTI without appending any cyclic prefix prior to it; and
- a concatenation of the time-domain samples of said first OFDM symbol and said second part of the TTI that comprise the TTI in the time domain.

Additionally, the method further comprises the following steps at the receiver side:
at the receiver side, recovering the information contained in the TTI by means of the following procedure:
- separating a first part of the TTI, containing the first OFDM symbol and excluding the appended cyclic prefix, from a second part of the TTI, containing the remaining OFDM symbols, said first and second parts being denoted by $r_a^{TTI}[n]$ and $r_b^{TTI}[n]$ respectively;
- recovering the information contained in said first part of the TTI by means of the following procedure:
- estimate the carrier frequency offset, CFO with the aid of said first OFDM symbol including the CP, and compensate the effect of the CFO in both the first OFDM symbol and the second part of the TTI;
- perform a Fourier transform of said first OFDM symbol after correcting the CFO and discarding the CP, in order to estimate the channel frequency response by means of the pilot subcarriers;
- recover the transmitted information in said first OFDM symbol through channel equalization and symbol decoding; and
- reconstruct the time-domain transmitted signal corresponding to said first OFDM symbol (excluding the cyclic prefix) by applying an inverse FFT of the decoded symbols with length $N_{OFDM}$, denoted by $s_a^{TTI}[n]$;
- removing, at the receiver side, inter-symbol interference, or ISI, from the second part of the TTI by means of the following procedure:
- performing an inverse Fourier transform of the channel frequency response estimated at the first OFDM symbol in order to obtain the channel impulse response, or CIR, denoted as $h[n]$;
- identifying the most significant peaks, or taps, of the CIR, denoted as $N_{taps}$, said CIR being thus written in the form:

$$h[n] = \sum_{j=0}^{N_{taps}-1} a_j \delta[n - \tau_j],$$

where $N_{taps}$ denotes said number of most significant taps, $a_j$ is the complex amplitude of the j-th tap, $\tau_j$ is the discrete delay associated to the j-th tap, and $\delta(\cdot)$ represents the discrete delta function;
- removing inter-symbol interference, or ISI, from $r_b^{TTI}[n]$ by means of the following equation:

$$r_{b,ISI}^{TTI}[n] = r_b^{TTI}[n] - \sum_{j=0}^{N_{taps}-1} a_j \tilde{s}_a^{TTI}[n - \tau_j + N_{OFDM}],$$

where $r_{b,ISI}^{TTI}[n]$ denotes the signal of the second part of the TTI after ISI removal, n is the time index that can take the values
$n=0, \ldots, (N_{sym}-1) \cdot N_{OFDM}-1$, and $\tilde{s}_a[n]$ is equal to $s_a[n]$ for $0 \le n < N_{OFDM}$ and zero outside:

$$\tilde{s}_a^{TTI}[n] \equiv \begin{cases} s_a^{TTI}[n], & 0 \le n < N_{OFDM} \\ 0, & \text{outside} \end{cases};$$

- removing, at the receiver side, inter-carrier interference, or ICI, from the second part of the TTI by means of the ICI cancellation algorithm described by the following steps:
- taking the received signal of the first OFDM symbol in the next TTI, denoted as $r_a^{TTI+1}[n]$, and perform a Fourier transform of said first OFDM symbol after discarding the CP, in order to estimate the channel frequency response by means of the pilot subcarriers;
- recovering the transmitted information in said first OFDM symbol of the next TTI through channel equalization and symbol decoding;
- reconstructing the time-domain transmitted signal corresponding to said first OFDM symbol in the next TTI (excluding the cyclic prefix) by applying an inverse FFT of the decoded symbols with length $N_{OFDM}$, denoted by $s_a^{TTI+1}[n]$;
- removing ICI from the second part of the current TTI by means of the following equation:

$$r_{b,ISI,ICI}^{TTI}[n] = r_{b,ISI}^{TTI}[n] + r_a^{TTI+1}[n] - \sum_{j=0}^{N'_{taps}-1} a'_j \tilde{s}_a^{TTI+1}[N_{OFDM} - N_{CP} + n - \tau'_j],$$

where $r_{b,ISI,ICI}^{TTI}[n]$ denotes the received second part of the current TTI after removing the ISI and ICI components; $N'_{taps}$, $a'_j$ and $\tau'_j$ refer to the channel tap components estimated in the first OFDM symbol of the next TTI;

$n=0, \ldots, (N_{sym}-1) \cdot N_{OFDM}-1$; and:

$$\tilde{s}_a^{TTI+1}[n] \equiv \begin{cases} s_a^{TTI+1}[n], & N_{OFDM} - N_{CP} \leq n < N_{OFDM} \\ 0, & \text{outside} \end{cases};$$

perform channel estimation in the second part of the TTI after ISI/ICI removal, and perform channel equalization and symbol decoding with the aid of the channel estimation;

perform a de-interleaver operation of the complex symbols; and perform FEC decoding of the de-interleaved symbols in order to obtain the received information block.

In a second aspect of the present invention, a system for reducing the overhead caused by the presence of the cyclic prefix while enabling ISI and ICI cancellation in OFDM wireless communication networks is disclosed. The system comprises an OFDM transmitter and at least one OFDM receiver connected to the OFDM transmitter via a wireless interface (e.g. in a LTE network), the OFDM transmitter and the, at least one, OFDM receiver comprising means for implementing the method described before at the transmitter side and the receiver side respectively.

Another aspect of the present invention refers to an OFDM transmitter as described in the system defined above for implementing the method described at the transmitter side.

Another aspect of the present invention refers to an OFDM receiver as described in the system defined above for implementing the method described at the receiver side.

In a last aspect of the present invention, a computer program is disclosed, comprising computer program code means adapted to perform the steps of the described method, when said program is run on processing means of a network entity (base station or user terminal) of an OFDMA network, said processing means being a computer, a digital signal processor, a field-programmable gate array (FPGA), an application-specific integrated circuit (ASIC), a micro-processor, a micro-controller, or any other form of programmable hardware.

The method in accordance with the above described aspects of the invention has a number of advantages with respect to prior art, which can be summarized as follows:

The proposed TTI structure differs from the one proposed in U.S. Pat. No. 7,606,138. In the present proposal, the prepended CP is a replica of the last samples of the first OFDM symbol which remains unchanged with respect to prior art techniques. In U.S. Pat. No. 7,606,138, by contrast, the CP is a replica of the last samples of the frame thus leading to a single enlarged OFDM symbol, and equalization and channel estimation must therefore be performed over the whole block of samples thus complicating the detection scheme.

The present invention simplifies this arrangement of OFDM symbols by assigning different roles to the first and subsequent OFDM symbols: the first symbol provides simple channel estimation and frequency offset compensation capabilities, while the remaining part of the TTI benefits from simple ISI and ICI cancellation procedure (with the aid of the channel impulse response estimated at the first symbol) while improving spectral efficiency.

The proposed invention allows for a significant reduction in the overhead incurred by the cyclic prefix, while also reducing the complexity associated with the reception process. Allocating a single CP at the beginning of a transmission interval allows the receiver to enjoy the benefits of ISI-free reception of the first symbol, also enabling simple compensation of the carrier frequency offset (CFO) and channel estimation. The remaining part of the TTI can also be detected through a proposed procedure that removes inter-symbol and inter-carrier interference, by exploiting a new way of packing the information as well as the pilot subcarriers when generating the time-domain OFDM signal. The presence of CP in the first OFDM symbol allows for compensation of the carrier frequency offset (CFO) up to half the subcarrier width as in prior art techniques, while the remaining symbols can enjoy simpler detection through a longer FFT/IFFT process without compromising the maximum supported CFO. The longer FFT/IFFT associated with the second part of the TTI does not imply a reduction in the maximum allowed CFO. Hence CFO can be compensated for the whole TTI irrespective of the lower subcarrier width that results from considering the second part of the TTI as an "enlarged" OFDM symbol. Channel estimation is decoupled from ISI/ICI cancellation, thus enhancing the detection process, and successful removal of ISI and ICI only relies on proper channel estimation at the first OFDM symbols, which can be ideally performed with the aid of the preserved CP. All these characteristics allow for significant reductions in the symbol length while keeping the overhead from the cyclic prefix significantly lower than in prior art techniques at a lower computational cost.

The present invention only requires one CP to be appended at the beginning of the first symbol in a TTI, thus leading to significant efficiency increase compared to the case where different CPs must be appended prior to each OFDM symbol. Leaving the CP at the beginning of the first symbol has the added advantage of allowing the receivers to "sleep" at intervals according to the discontinuous reception procedure (DRX), because the first symbol can easily be detected with standard techniques thereby increasing battery life.

The proposed invention introduces a simplification compared to prior art techniques for cancellation of ISI and ICI, where traditionally all OFDM symbols must be processed in a serial way and errors can be propagated. Instead, this invention proposes a method to remove ISI and ICI for the whole part of the TTI without suffering from error propagation impairments and at a lower computational cost.

These and other objects, advantages and features of the invention wille become apparent upon review of the following specification in conjunction with the drawings.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character:

FIG. 1 shows an OFDM frame structure in a time transmission interval, as known in prior art;

FIG. 2 shows an OFDM frame structure in a time transmission interval, according to a preferred embodiment of the invention;

DESCRIPTION OF THE PREFERRED EMBODIMENTS

Figure 3:
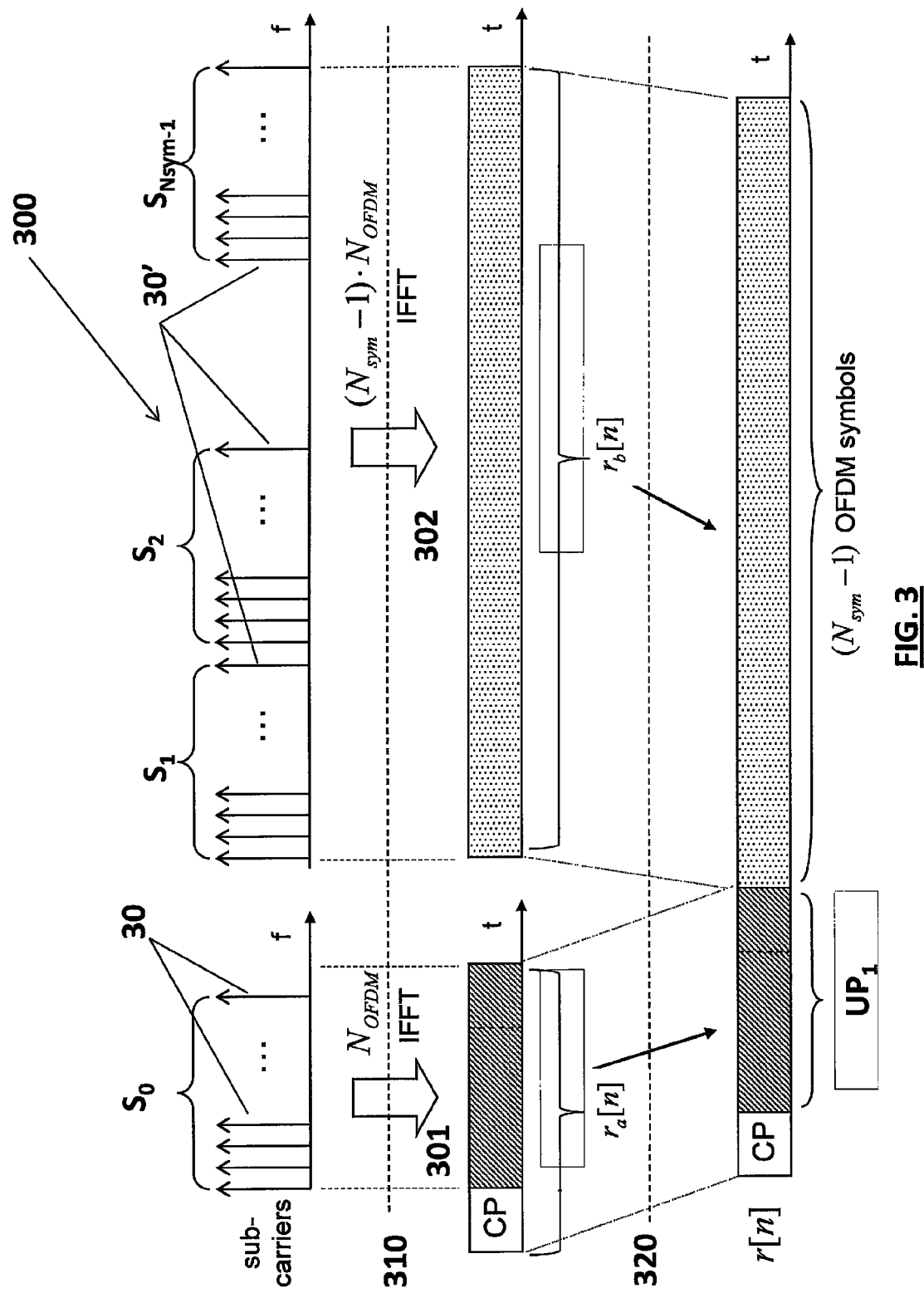
FIG. 3 shows a process for generating the two parts of a time transmission interval, in accordance with a possible embodiment of the invention.

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-11.

FIG. 1 shows the frame structure 100 of a sequence of standard OFDM symbols, $SS_1$, $SS_2$, ... $SS_N$, in a time transmission interval, TTI. Every OFDM symbol, $SS_1$, $SS_2$, ... $SS_N$, comprises a cyclic prefix, CP, at the beginning of each symbol in the TTI, which is followed by a useful part, $UP_1$, $UP_2$, ... $UP_N$, containing control data or user data.

FIG. 2 presents the frame structure 200 of a sequence of OFDM symbols, $S_0, S_1, \ldots S_{Nsym-1}$, according to a preferred embodiment of the invention, in a time transmission interval, TTI. In order to reduce the overhead caused by the cyclic prefix, CP, the proposed frame structure 200 is built according to the following features:

Leave only the first CP at the beginning of the first symbol $S_0$ in every TTI. Thus, the frame structure 200 carries overhead associated with only a single one CP located at the beginning of the first part 201 of the TTI. The cyclic prefix CP contains a replica of the last samples of the first OFDM symbol $S_0$.

Introduce an additional interleaver operation after Forward Error Correction (FEC) encoding and prior to mapping to time-frequency resources for the remaining part 202 of the TTI, in order to increase the frequency diversity.

Change the distribution of pilot subcarriers along the frequency domain of the remaining part 202 of the TTI, in order to enable channel estimation.

Change the way in which the time-domain samples for the remaining part 202 of the TTI are generated from the corresponding subcarriers in the frequency domain, so that ISI and ICI cancellation can be performed at the receiver side for the whole remaining part 202 of the TTI (and not on a per-symbol basis) without compromising the maximum supported carrier frequency offset (CFO).

The cyclic prefix CP introduces a loss in efficiency that can be quantified by the expression:

$$\eta = \frac{N_{CP}}{N_{CP} + N_{OFDM}},$$

where $\eta$ is the loss in efficiency, $N_{CP}$ is the length of the cyclic prefix CP and $N_{OFDM}$ is the length of the useful part $UP_1$ of the first symbol $S_0$, i.e., the OFDM symbol length excluding the CP length, (both $N_{CP}$ and $N_{OFDM}$ given as a number of samples). This loss in efficiency directly translates into a loss in throughput compared to the Shannon bound.

The second and subsequent symbols in the remaining part 202 of the TTI have no appended CP, therefore reducing the loss in efficiency to:

$$\eta' = \frac{N_{CP}}{N_{CP} + N_{sym} \cdot N_{OFDM}} < \eta,$$

where $\eta'$ is the efficiency loss after application of the proposed invention and $N_{sym}$ is the number of OFDM symbols in the TTI.

The way for transforming the OFDM subcarriers 30, 30' in frequency-domain (f) into time-domain (t) samples, in order to obtain the proposed frame structure 300 is depicted in FIG. 3. Two parts of a TTI can be identified in FIG. 3: the first part 301 which comprises the first OFDM symbol including the CP and the second (remaining) part 302 of the TTI with no CP. The sets of time-domain samples of the first part 301 and the remaining part 302 of the TTI are denoted respectively as $r_a^{TTI}[n]$ and $r_b^{TTI}[n]$, wherein $r_a^{TTI}[n]$ comprises the useful part of the first OFDM symbol $S_0$ after the CP and $r_b^{TTI}[n]$ comprises the remaining samples of the TTI (beginning with index zero).

FIG. 3 illustrates the Inverse FFT operations, IFFT, required to generate 310 the sets of time-domain samples $r_a^{TTI}[n]$ and $r_b^{TTI}[n]$ of the proposed first part 301 and second part 302 of the TTI in the time domain, and the concatenation 320 of the resulting samples to obtain the received signal r[n] in the given TTI.

The first symbol $S_0$ contains a regular CP with a length $N_{CP}$ given by the maximum delay spread supported by the OFDM system, thus avoiding ISI and ICI. The remaining part 302 of the TTI however lacks from any CP in order to increase efficiency, and transmission and reception procedures must be changed for this remaining part 302 in order to overcome the resulting ISI and ICI.

Figure 4:
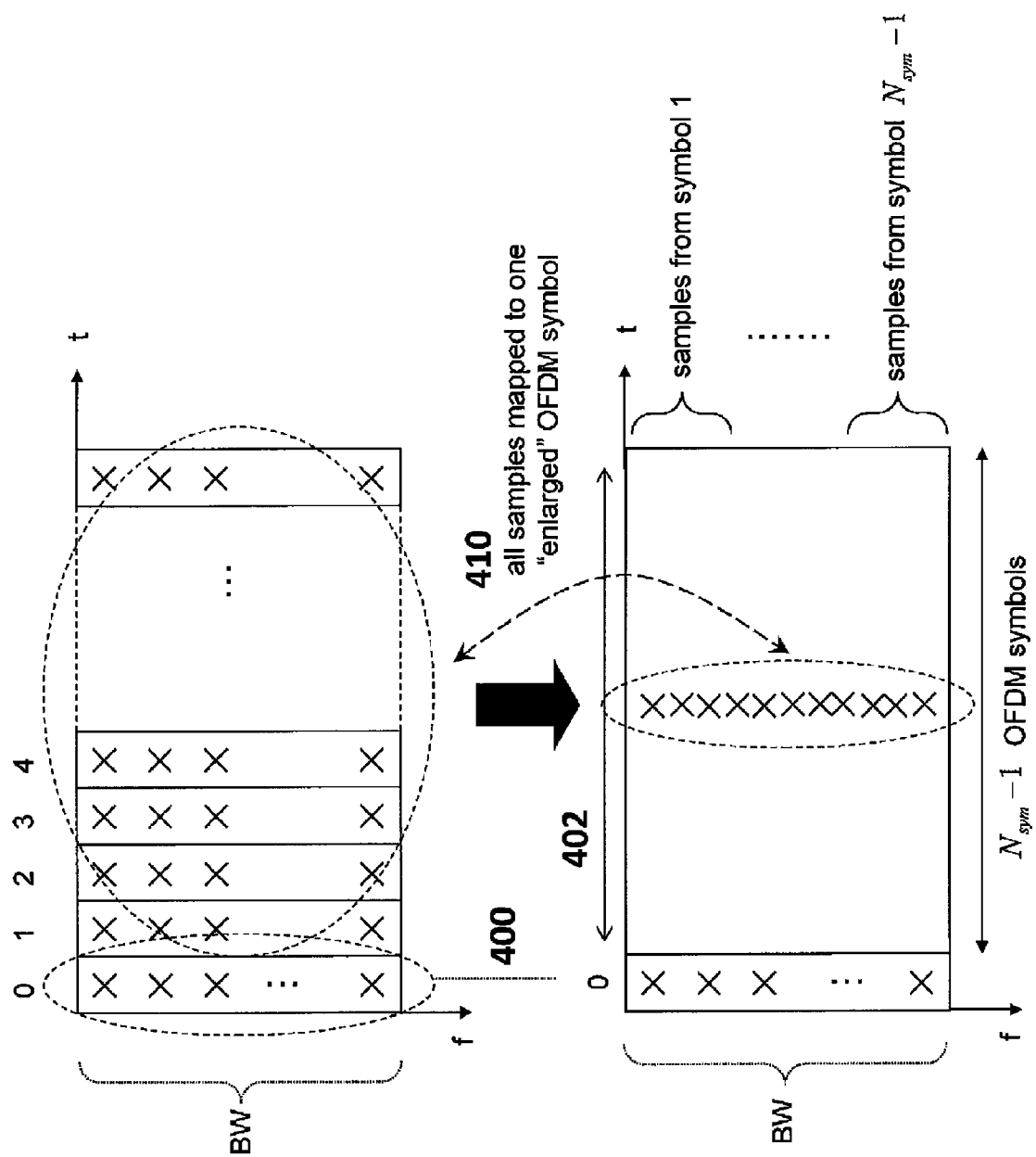
FIG. 4 shows a process for mapping the complex symbols to time-frequency resources for the two parts of the time transmission interval, in accordance with a possible embodiment of the invention.

FIG. 4 illustrates the mapping process of complex OFDM symbols to time-frequency resources. The time-domain samples from each symbol are obtained in a different way for both parts of the TTI. For the first OFDM symbol, samples are obtained 400 using standard techniques through application of an inverse FFT of the complex subcarriers that carry the information as well as the pilot symbols for channel estimation. However, the remaining part 402 of the TTI is obtained from a longer inverse FFT of the concatenated set of subcarriers corresponding to the $(N_{sym}-1)$ remaining original OFDM symbols. As the system bandwidth BW is unchanged, the subcarriers are more densely "packed" in the second part of the TTI by a factor $(N_{sym}-1)$, as shown in FIG. 4. Thus, all samples are mapped 410 to one enlarged OFDM symbol. The length of the second part 402 in the time domain also grows by the same factor hence keeping the sampling frequency unchanged, and the same amount of information per TTI is thus included. Appropriate guard bands must also be observed by leaving a number of unmodulated subcarriers before and after the set of non-null subcarriers prior to the IFFT operation. The length of the guard band in the frequency domain is increased by a factor $(N_{sym}-1)$ compared to prior art techniques; however the frequency resolution is also increased by the same factor, therefore yielding the same guard bands overhead as in prior art techniques.

It is to note that this way of translating information from the frequency domain f to the time domain t is completely different than in prior art techniques. Concatenation of the subcarrier amplitudes in the second part 402 of the TTI leads to a time-domain signal which is completely different than the one obtained using standard techniques, where a cascade of inverse FFTs provides the symbols in a serial way (after inclusion of the CP). In fact, the original number of subcarriers per each OFDM symbol in prior art techniques is now replaced by a proportionally higher number of subcarriers for the remaining part of the TTI. The occupied bandwidth BW is not changed, as it comprises the same information over the same time interval, but the samples are obtained from a single IFFT of the concatenation of all the subcarriers after the first OFDM symbol, thus increasing the frequency resolution by a factor $(N_{sym}-1)$ compared to prior art. The main advantage of this arrangement is a more efficient way to deal with ISI and ICI, while not impacting the maximum supported CFO that is determined by the first OFDM symbol. In addition, the ISI and ICI cancellation algorithm only depends on proper channel estimation in the first OFDM symbol, thus improving reliability thanks to the preserved CP.

Figure 5:
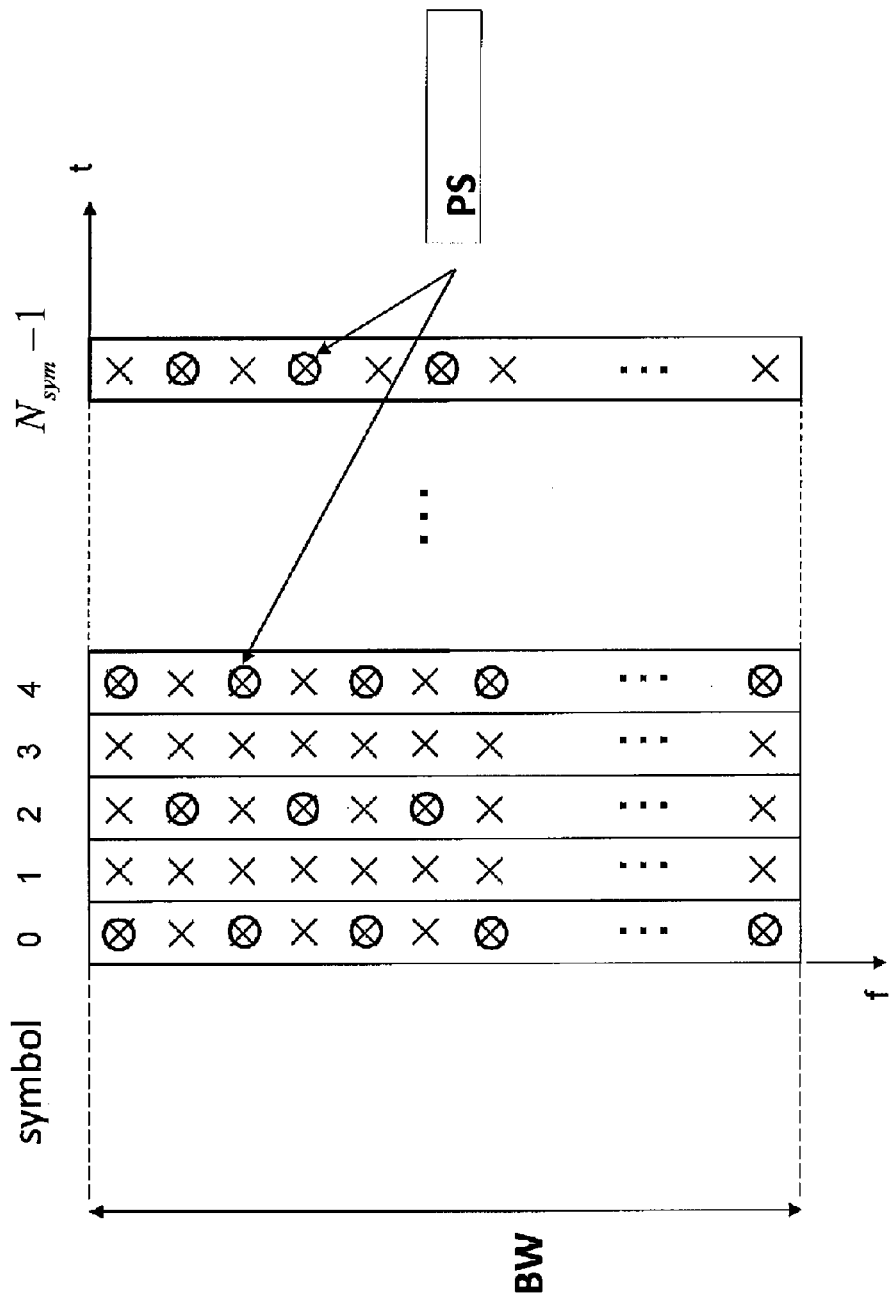
FIG. 5 shows a process for allocating OFDM pilot subcarriers into the frame structure, as known in prior art.

In order to perform channel estimation over the second part of the TTI for successful decoding, pilot subcarriers must be arranged so as to cover the system bandwidth with a frequency separation given by the minimum channel coherence bandwidth to be supported (see FIG. 5). Although the figure does not accurately reflect the increased frequency resolution in the second part of the TTI, the separation between pilot subcarriers in the frequency domain should be increased by a factor $(N_{sym}-1)$ compared to that in the first symbol, there being a larger number of data subcarriers between each pair of pilot subcarriers. Channel estimation accuracy is however not impacted as the channel coherence bandwidth also extends over $(N_{sym}-1)$ times the subcarriers involved in the first OFDM symbol, therefore leading to the same channel estimation capabilities.

Figure 6:
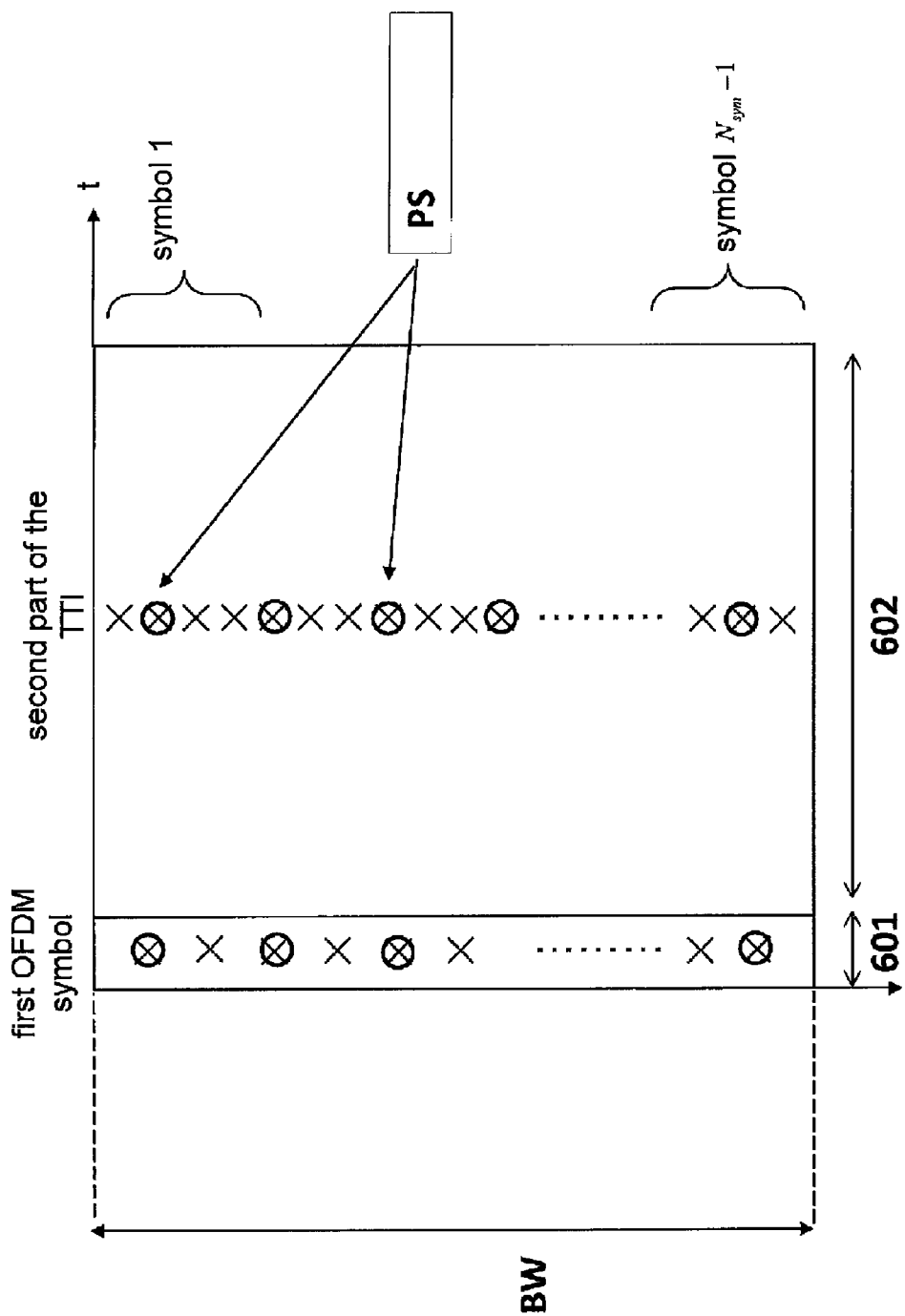
FIG. 6 shows a process for allocating OFDM pilot subcarriers into the frame structure, according to a possible embodiment of the invention.

FIG. 5 shows the allocation of pilot subcarriers PS for channel estimation in accordance with the prior art solutions. FIG. 6 shows the allocation of pilot subcarriers PS for channel estimation according to a proposed embodiment of the invention.

A fundamental difference of the proposed frame structure with respect to prior art lies in the CFO compensation capabilities. It could be argued that the proposed structure is essentially similar to having a single, longer OFDM symbol with the duration of a TTI and a cyclic prefix appended to it, thereby allowing detection of the samples with a single FFT/IFFT. However, with only one OFDM symbol in the TTI, the maximum allowed CFO would be decreased in the same way as the width of the subcarriers would do because of the longer OFDM symbol. In the proposed frame structure, the maximum supported CFO is however unchanged, as determined by the first OFDM symbol, while the second part of the TTI can effectively collect the samples from the remaining original OFDM symbols for easier ISI/ICI removal without impacting the maximum CFO. The proposed structure also has advantages in terms of an easier decoding process of the control signals in the first OFDM symbol, which is a key aspect in order to reduce battery consumption at the user device, provide robust control signaling and allow discontinuous reception (DRX). The proposed arrangement of subcarriers in the frequency domain of the second part of the TTI, as shown in FIG. 6, also has implications in the way users are scheduled by a base station. Prior art OFDM systems (such as e.g. LTE) allocate portions of the spectrum to the users over a number of OFDM symbols, whereas in this invention the users are capable of comprising a higher number of subcarriers over a single "enlarged" symbol which includes the remaining part of the TTI. In practice, the scheduler of the base station have to deal with a number of subcarriers that could generally experience different frequency responses, while in prior art techniques the subcarriers corresponding to different OFDM symbols undergo approximately similar channel conditions (at least for moderate UE speeds). The consequence of this feature is a higher granularity in the frequency domain, thus allowing for more precise allocation of resources. However, the higher frequency resolution results in lower frequency diversity for the complex samples, because adjacent subcarriers could experience lower channel variations in the frequency domain than in prior art, thus impairing the FEC decoding process. To compensate this undesired effect, an additional interleaver prior to subcarrier mapping can effectively increase frequency diversity and thus enhance the FEC decoding process.

Figure 7:
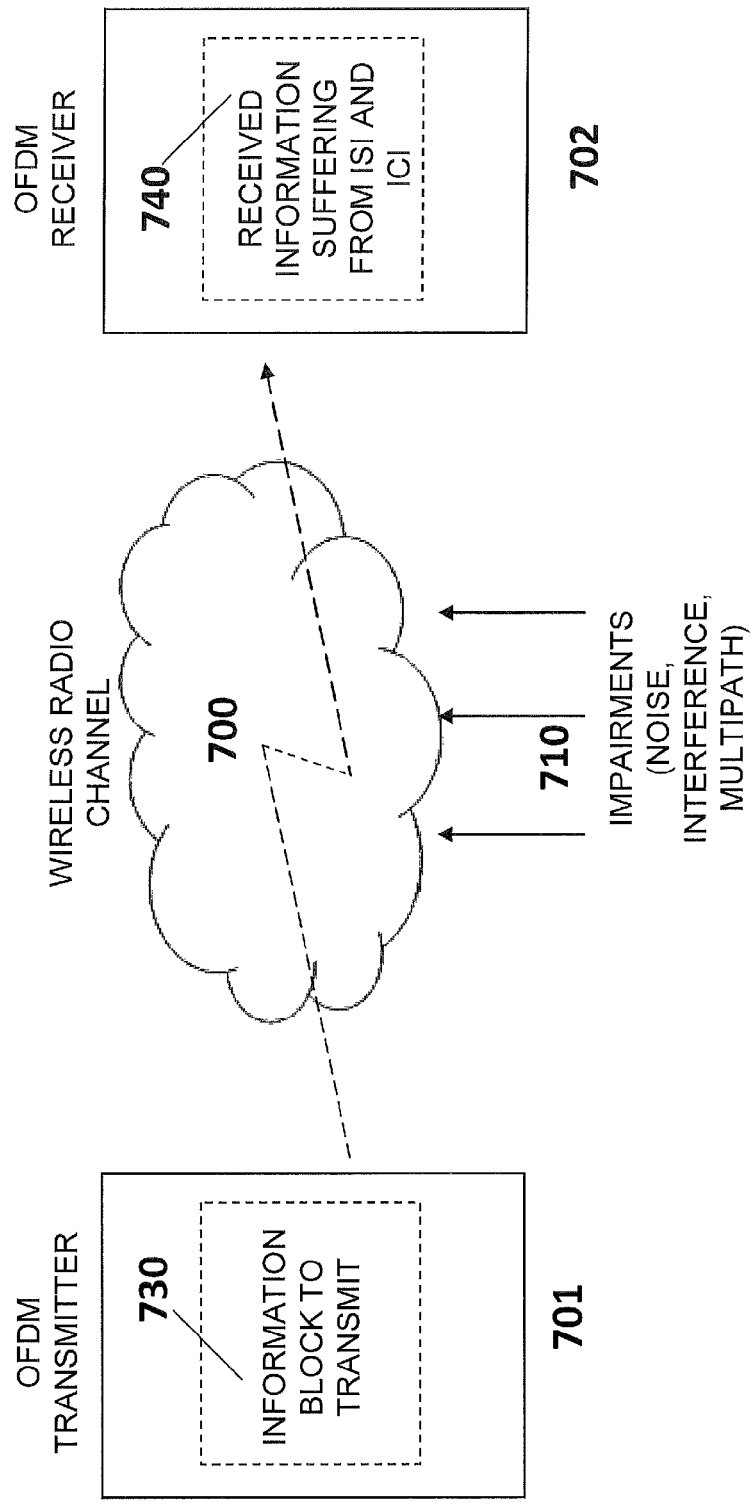
FIG. 7 shows a schematic diagram of a network scenario for a possible application case of the invention in performing cancellation of inter-symbol and inter-carrier interference.

FIG. 7 shows a very simplified scenario for application of the proposed frame structure, in a possible embodiment of the invention, providing a system for reduction of the overhead caused by the presence of the cyclic prefix, while enabling inter-symbol interference (ISI) and inter-carrier interference (ICI) cancellation. The system comprises an OFDM transmitter 701 and at least one OFDM receiver 702, the OFDM transmitter 701 and each OFDM receiver 702 being connected through a wireless radio channel 700 which introduces a number of impairments 710, mainly noise (in the form of Gaussian noise and other types of interference) and multipath. The latter introduces significant inter-symbol interference (ISI) and inter-carrier interference (ICI) that must be cancelled at the receiver side prior to successful decoding of the symbols, containing information 740 suffering from ISI and ICI, received by the OFDM receiver 702. The OFDM transmitter 701 sends the information blocks 730 to be transmitted in the TTI according to the proposed frame structure.

Let us denote with $r^{TTI}[n]$ the signal received in a given TTI received by the OFDM receiver 702, and the two parts of the received TTI are denoted as $r_a^{TTI}[n]$ and $r_b^{TTI}[n]$ respectively, where $r_a^{TTI}[n]$ refers to the first OFDM symbol (excluding CP) and $r_b^{TTI}[n]$ refers to the remaining original ($N_{sym}-1$) OFDM symbols. For ease of notation, the time indices run from zero in both parts, thus:

$$r_a^{TTI}[n] = r^{TTI}[n+N_{CP}], \quad n=0, \ldots, N_{OFDM}-1,$$

$$r_b^{TTI}[n] = r^{TTI}[n+N_{CP}+N_{OFDM}], \quad n=0, \ldots, (N_{sym}-1)\cdot N_{OFDM}-1.$$

$r_a^{TTI}[n]$ comprises the useful part of the first OFDM symbol after the CP, and
$r_b^{TTI}[n]$ comprises the remaining samples of the TTI (beginning with index zero).

Figure 8:
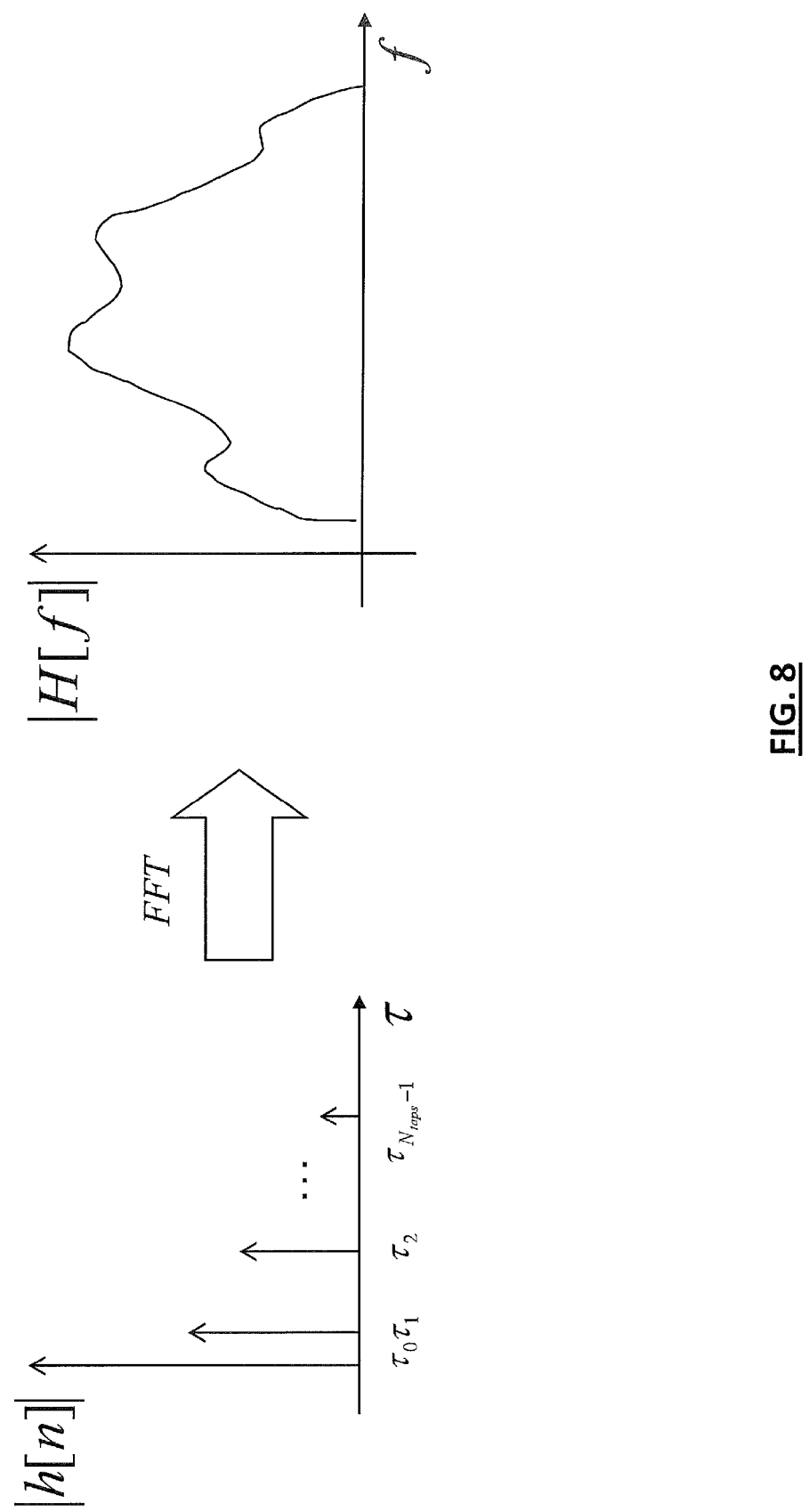
FIG. 8 shows a diagram of the channel impulse response and its associated channel frequency response.

From the first part $r_a^{TTI}[n]$, it is possible to detect the transmitted information through standard OFDM detection techniques, including estimation of the channel frequency response H[f], shown in FIG. 8, with the aid of suitable pilot sub-carriers PS or training signals. The time-domain transmitted signal corresponding to the first OFDM symbol (excluding the cyclic prefix), denoted here by $s_a^{TTI}[n]$, can be reconstructed through proper equalization, demodulation and application of inverse FFT. It is to note that equalization and detection are not limited to the subcarriers scheduled for the user, but performed over the whole system bandwidth including other users and control channels. This is required in order to be able to reconstruct the complete time-domain first OFDM symbol that produces inter-symbol interference towards the next symbols. The user could detect all the control information included in the first symbol (performing FEC decoding of all the control information), but this may involve additional signalling from the network in order to aid in the decoding process. Instead, the user can perform simpler hard-decision decoding of the complex modulated symbols, thus estimating the constellation symbols that are nearest to the equalized symbols for each of the subcarriers. This procedure is suitable for low-order modulations (like QPSK), as typically employed for the control information.

The remaining part $r_b^{TTI}[n]$ of samples in the TTI suffers from ISI and ICI due to the absence of cyclic prefix. At the OFDM receiver 702, an objective is to effectively remove ISI and ICI according to the procedure explained below.

FIG. 8 illustrates an example channel impulse response (CIR) and its associated channel frequency response. The time-domain channel impulse response (CIR) at the first OFDM symbol can be obtained by performing an inverse FFT of the channel frequency response estimated at the first OFDM symbol, i.e., the CIR can be written by the expression $h[n]=IFFT\{H[f]\}$. The CIR in general comprises a number of delayed discrete delta functions representing the multipath components of the radio channel (commonly known as taps), each having different amplitudes, phases and associated delays, as shown in FIG. 8). The receiver 702 can then extract the most significant multipath components from the CIR. Identification of the peaks or taps of the CIR and their respective delays $\tau_0, \tau_1, \ldots, \tau_{Ntaps-1}$ ($N_{taps}$ denotes the number of significant taps) can be based on a suitable threshold for the CIR amplitudes below which the influence of the tap can be considered negligible, but any other procedure is also valid for the purpose of the present invention.

After identification of the most significant or strongest taps, the CIR in the first OFDM symbol can be written in the form:

$$h[n] = \sum_{j=0}^{N_{taps}-1} a_j \delta[n - \tau_j],$$

where $N_{taps}$ is the number of significant taps, $a_j$ is the complex amplitude of the j-th tap, $\tau_j$ is the delay associated to the j-th tap, and $\delta(\cdot)$ represents the discrete delta function.

The ISI component towards the second (remaining) part $r_b^{TTI}[n]$ of the TTI can then be written in the form:

$$ISI = \sum_{j=0}^{N_{taps}-1} a_j \tilde{s}_a^{TTI}[n - \tau_j + N_{OFDM}], \quad 0 \le n \le \tau_{max},$$

where n is the time index, $\tau_{max}$ is the maximum value of the channel delays, and $\tilde{s}_a^{TTI}[n]$ is equal to $s_a^{TTI}[n]$ for $0 \le n < N_{OFDM}$ and zero outside:

$$\tilde{s}_a^{TTI}[n] \equiv \begin{cases} s_a^{TTI}[n], & 0 \le n < N_{OFDM} \\ 0, & \text{outside} \end{cases}.$$

The ISI component can be subtracted from $r_b^{TTI}[n]$, thus yielding the signal $r_{b,ISI}^{TTI}[n]$ with ideally no ISI from the first OFDM symbol:

$$r_{b,ISI}^{TTI}[n] \equiv r_b^{TTI}[n] - ISI = r_b^{TTI}[n] - \sum_{j=0}^{N_{taps}-1} a_j \tilde{s}_a^{TTI}[n - \tau_j + N_{OFDM}],$$

where the index n in this equation can take the values $n=0, \ldots, (N_{sym}-1)\cdot N_{OFDM}-1$. $r_{b,ISI}^{TTI}[n]$ will thus be a "cleaned" version of the second part $r_b^{TTI}[n]$ of the TTI after ISI removal.

Prior to performing frequency-domain equalization, it is also necessary to restore the cyclicity of the OFDM signal, i.e. to cancel ICI. Cyclicity is lost because, as a consequence of the multipath components, the delayed replicas of the signal do not appear as cyclic shifts (as would happen with a proper CP). The OFDM samples which are "lost" to the right of the TTI are then introduced to the left as in a circular shift register, after being affected by the complex amplitudes and delays of the multipath components.

The samples to be reconstructed are in principle unknown, but they can be found in the form of ISI towards the first OFDM symbol of the next TTI. This ISI component can in turn be obtained by subtracting the delayed replicas of the reconstructed cyclic prefix from the beginning of the first symbol in the next TTI. Denoting with $r_a^{TTI+1}[n]$ the received signal of the first symbol in the next TTI, and $s_a^{TTI+1}[n]$ the corresponding reconstructed samples in the time-domain after equalization, demodulation and inverse FFT, we have:

$$ISI^{TTI+1}[n] = r_a^{TTI+1}[n] - \sum_{j=0}^{N'_{taps}-1} a'_j \tilde{s}_a^{TTI+1}[N_{OFDM} - N_{CP} + n - \tau'_j],$$

$$0 \le n < N_{CP},$$

where $ISI^{TTI+1}[n]$ represents the ISI component from the current TTI that extends towards the first symbol of the next TTI; $N'_{taps}$, $a'_j$ and $\tau'_j$ refer to the channel tap components estimated in the first OFDM symbol of the next TTI; and:

$$\hat{s}_a^{TTI+1}[n] \equiv \begin{cases} s_a^{TTI+1}[n], & N_{OFDM} - N_{CP} \le n < N_{OFDM} \\ 0, & \text{outside} \end{cases}.$$

The equation exploits the fact that the CP is present at the end of the reconstructed first OFDM symbol, which can therefore be subtracted from the received signal in order to obtain the ISI term. This component is exactly the same term that is added to the beginning of the second part $r_b^{TTI}[n]$ of the current TTI in order to remove ICI. Denoting with $r_{b,ISI,ICI}^{TTI}[n]$ the received second part of the TTI after removing the ISI and ICI components, we can write:

$$r_{b,ISI,ICI}^{TTI}[n] = r_{b,ISI}^{TTI}[n] + r_a^{TTI+1}[n] - \sum_{j=0}^{N'_{taps}-1} a'_j \hat{s}_a^{TTI+1}[N_{OFDM} - N_{CP} + n - \tau'_j],$$

for $n=0, \ldots, (N_{sym}-1) \cdot N_{OFDM} - 1$.

The resulting signal in the second part $r_b^{TTI}[n]$ of the TTI ideally has no ISI and ICI from the absence of the CP. The only requirement is that the receiver additionally decodes the first OFDM symbol of the TTI next to the one to be detected. However, this is not a major problem as receivers usually have to decode that first symbol except in DRX mode, in order to obtain important control information such as scheduling and paging.

In contrast to prior art techniques, the algorithm does not operate over each of the OFDM symbols for ICI cancellation, but rather cancels ICI over the whole remaining part of the TTI after the first symbol thus leading to significantly lower complexity. In addition it does not rely on complex iterative methods that can suffer from chained estimation errors. The first OFDM symbol can be estimated with very low error probability given that it is usually QPSK-modulated for robust detection, which improves reliability of the ISI and ICI cancellation algorithm.

Channel estimation in the second part $r_b^{TTI}[n]$ of the current TTI can then be performed with the aid of the pilot subcarriers PS, arranged as in FIG. 6, after ISI and ICI cancellation.

An added advantage of the proposed invention is that the ISI and ICI cancellation algorithm only relies on accurate channel estimation in the first OFDM symbol of both the current and the next TTIs, which can be performed almost ideally with the aid of the CP.

After ISI and ICI cancellation, the second part $r_b^{TTI}[n]$ of the TTI can be detected by means of an FFT of length $(N_{sym}-1) \cdot N_{OFDM}$, followed by standard channel equalization and demodulation according to prior art techniques. It is assumed that the channel frequency response remains valid over the whole second part $r_b^{TTI}[n]$ of the TTI (as there is only one set of pilot subcarriers PS for channel estimation), that is, the channel coherence time is greater than the duration of the second part $r_b^{TTI}[n]$ of the TTI.

The main fundamental difference of this procedure with respect to prior art techniques is that it can be applied over the whole second part $r_b^{TTI}[n]$ of the TTI after the first OFDM symbol, instead of having to cancel ISI and ICI successively for each of the symbols. The ICI cancellation procedure particularly benefits from this, as it comprises a relatively complex iterative algorithm. Arranging the information after the first symbol with a longer FFT allows for easier ISI and ICI cancellation, while at the same time retaining the desirable properties of CFO robustness and channel estimation thanks to the presence of the first OFDM symbol. At the same time, the proposed ISI and ICI cancellation procedure relies on reconstruction of the first OFDM symbol of both the current and the next TTI, which by definition are ISI- and ICI-free.

The maximum supported CFO is not changed with respect to prior art solutions as the first symbol allows for estimation of the CFO up to half the subcarrier width. This can be exploited for CFO compensation in the whole TTI in spite of the higher FFT length required for the second part of the TTI, which gives rise to narrower subcarriers.

Applicability of this algorithm relies on the invariance of the channel impulse response along the second part $r_b^{TTI}[n]$ of the TTI. The channel coherence time $T_c$ should be higher than the duration of the second part $r_b^{TTI}[n]$ of the TTI according to the formula:

$$T_c = \frac{0.423}{f_d} = \frac{0.423c}{v f_c},$$

where $f_d$ is the Doppler frequency, c is the speed of light, v is the speed of the user and $f_c$ is the carrier frequency. Comparison of $T_c$ with the duration of the second part of the TTI would yield a maximum practical limit for user speed. If the second part $r_b^{TTI}[n]$ is small enough (in order to keep the end-to-end latency of the system at a low value), then this assumption is also valid for a significant range of user speeds.

Figure 9:
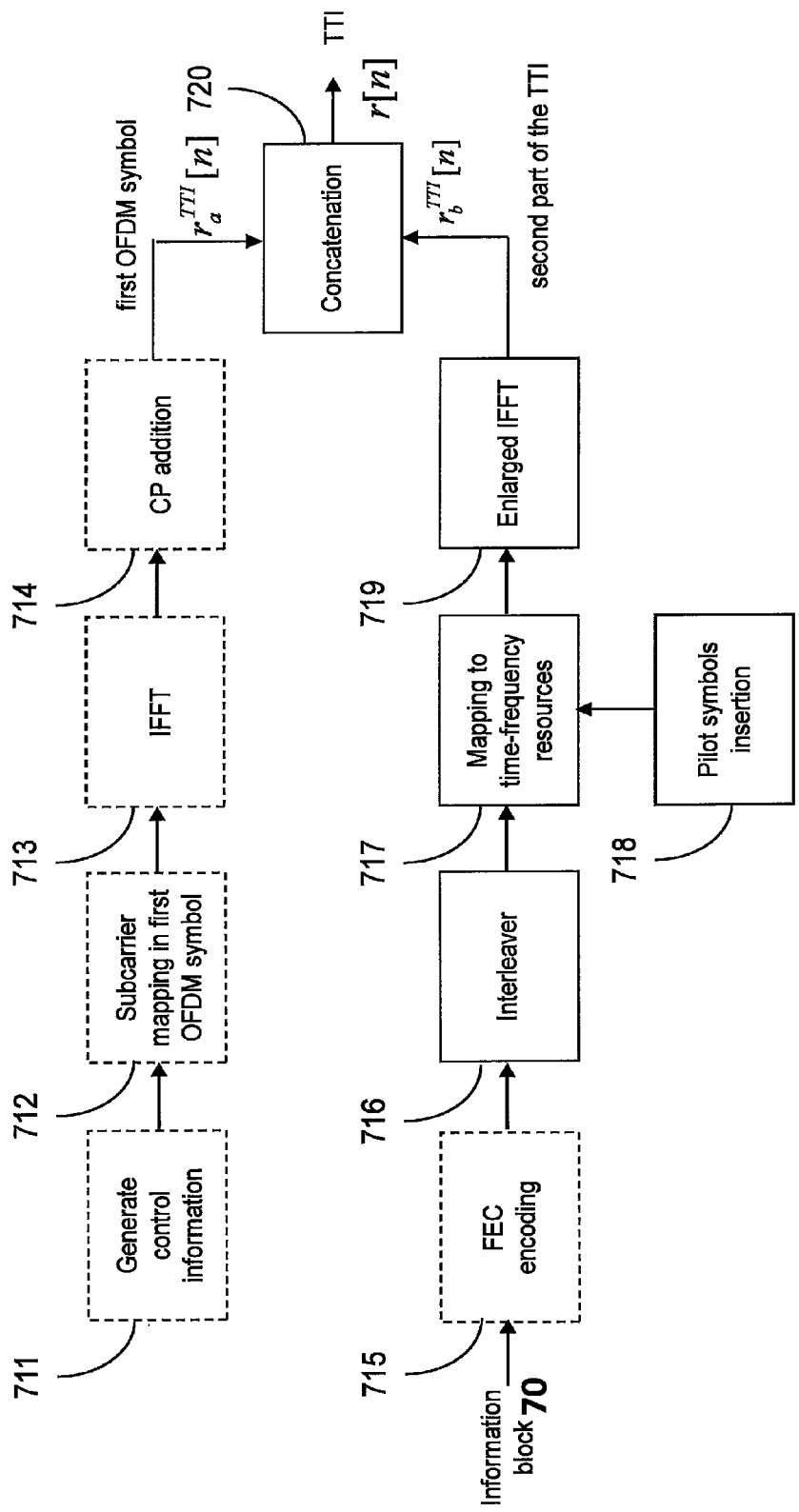
FIG. 9 shows a block diagram of the architecture of an OFDM transmitter, according to a possible embodiment of the invention.

FIG. 9 depicts in detail the steps of the transmission process to be followed by the OFDM transmitter 701 of the proposed system for reducing the overhead caused by the cyclic prefix and easing ISI and ICI cancellation (dashed blocks represent processing steps already present in prior-art techniques, while solid blocks represent new procedures as described in this invention):

a) In a first path to obtain the first part $r_a^{TTI}[n]$ of the TTI, including the useful part of the first OFDM symbol $S_0$ and the cyclic prefix CP:
   Firstly, generating 711 the necessary control information to be mapped (next step) into the first OFDM symbol $S_0$ in the TTI.
   Subcarrier mapping 712 to time-frequency resources in the first part $r_a^{TTI}[n]$ of the TTI.
   Performing an inverse FFT 713 to generate the corresponding time-domain samples,
   CP introduction 714.
b) In a second path to obtain the remaining part $r_b^{TTI}[n]$ of samples in the TTI:
   FEC encoding 715 of the information block 70.
   Interleaving 716 of the encoded bits. The interleaver can be based on an interleaver matrix, a permutation polynomial or any other suitable procedure that avoids adjacent bits to be mapped to adjacent subcarriers in the frequency domain, therefore increasing frequency diversity.
   Mapping 717 to time-frequency resources in the second part $r_b^{TTI}[n]$ of the TTI. Note that interleaving 716 is performed prior to this mapping.

Generation 718 of appropriate pilot symbols to be mapped on time-frequency resources for channel estimation in the second part $r_b^{TTI}[n]$ of the TTI.

Performs an "enlarged" inverse FFT 719 to generate the time-domain samples corresponding to the second part $r_b^{TTI}[n]$ of the TTI (without CP addition).

c) Finally, concatenation 720 of the two parts of samples, $r_a^{TTI}[n]$ and $r_b^{TTI}[n]$, which comprise the complete signal r[n] to be transmitted in the TTI at baseband level.

Figure 10:
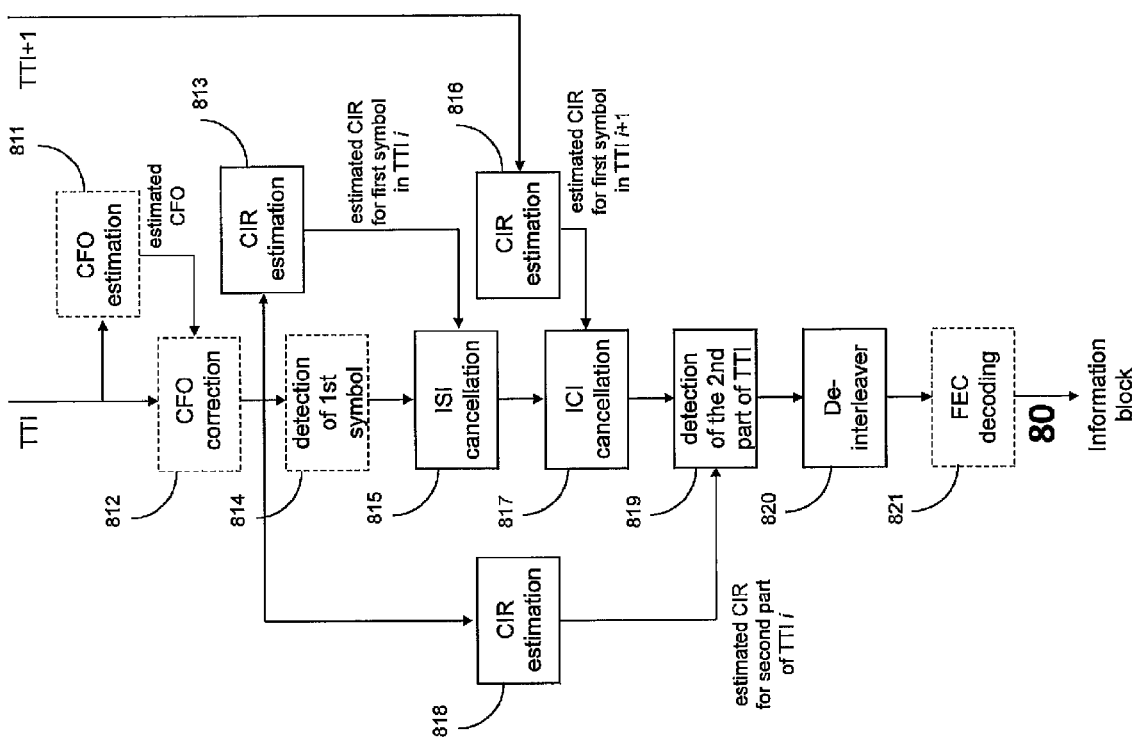
FIG. 10 shows a block diagram of the architecture of an OFDM receiver, according to a possible embodiment of the invention.

FIG. 10 depicts in detail the steps of the reception process to be followed by the OFDM receiver 702 of the proposed system for enabling ISI and ICI cancellation (dashed blocks represent processing steps already present in prior-art techniques, while solid blocks represent new procedures as described in this invention):

The current TTI, TTI i, is first analysed in order to estimate 811 the eventual carrier frequency offset CFO, with the aid of the first OFDM symbol and its associated cyclic prefix. CFO is further compensated 812 for the whole TTI using standard techniques.

Also CIR is estimated 813 in the first OFDM symbol of the current TTI, TTI i, from the CFO-compensated signal. CIR estimation 813 involves obtaining the channel frequency response as well as identifying the most significant multipath components from it.

The first part of the TTI, i.e, the first OFDM symbol, is detected 814 through proper channel equalization and demodulation.

From the OFDM symbols comprising the second part of the TTI, ISI is removed 815 with the aid of the first OFDM symbol detected in the step 814 and its CIR estimated in the step 813.

For the next (subsequent) TTI, TTI i+1, CIR estimation 816 is performed for the first OFDM symbol in said subsequent TTI, TTI i+1.

Using the CIR estimated 816 in the subsequent TTI, TTI i+1, the receiver performs ICI cancellation 817.

An additional CIR estimation 818 is then performed for the second part of the current TTI, TTI i, that comprises the "enlarged" OFDM symbol.

The second part of the TTI, with the remainging part of the "enlarged" OFDM symbol is detected 819. The receiver performs equalization and detection of this remaining part before de-interleaving 820.

The received information bits are de-interleaved 820 prior to FEC decoding in order to increase frequency diversity.

Finally, FEC decoding 821 is performed to allow the receiver to recover the original information block 80.

Figure 11:
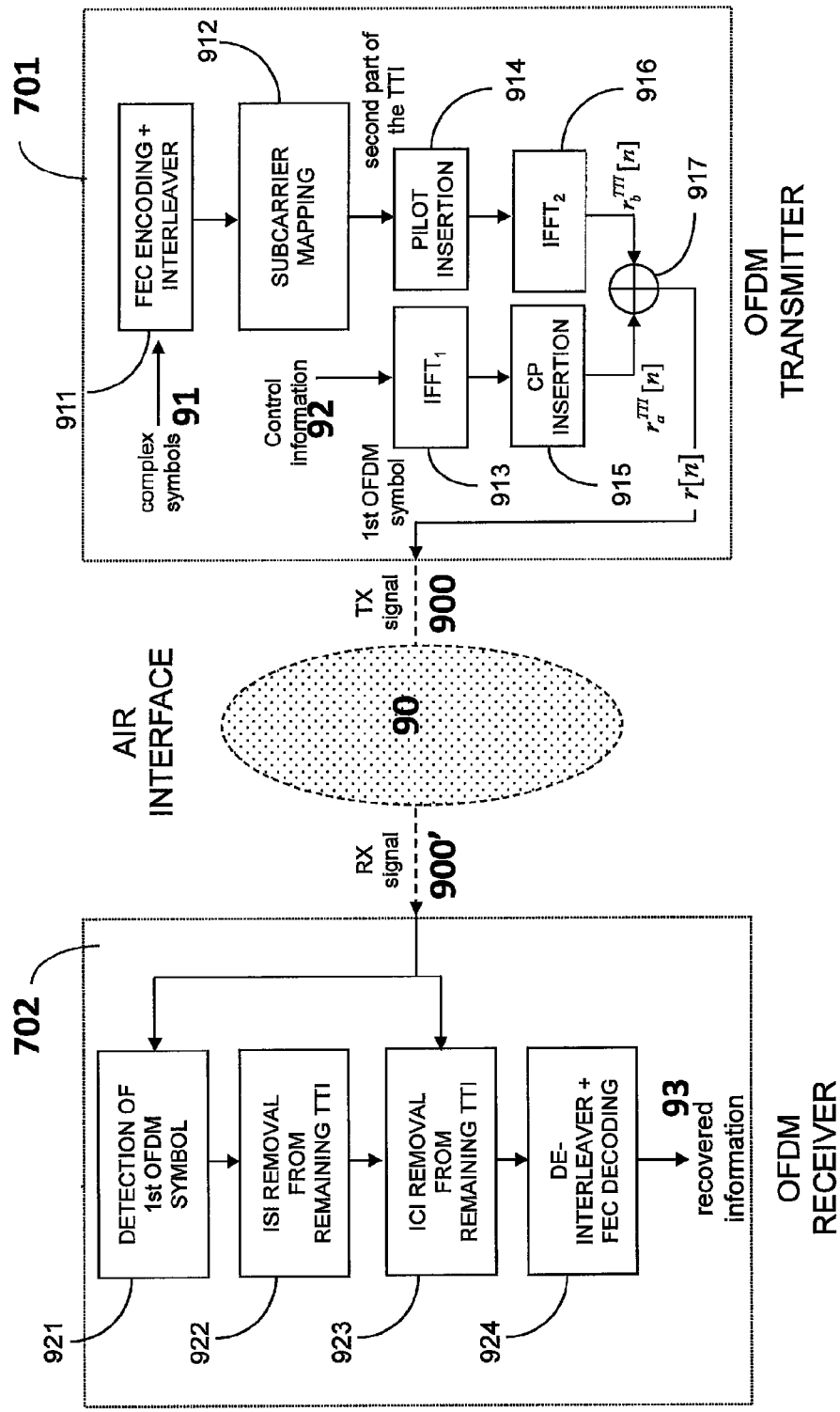
FIG. 11 shows a block diagram of the architecture of a system comprising the OFDM transmitter and the OFDM receiver described in FIGS. 9-10, according to a preferred embodiment of the invention.

FIG. 11 shows an exemplary detailed embodiment of the OFDM transmitter 701 and the OFDM receiver 702 of the proposed system according to the processes described before. An OFDM transmitter 701 is willing to transmit an information block in the form of a set of complex modulated symbols 91, which are first FEC-encoded and interleaved 911, and then subcarrier-mapped 912. Simultaneously, control information 91 undergoes a first inverse FFT 913 (of one OFDM symbol length), and a cyclic prefix is appended 915 to obtain the first part $r_a^{TTI}[n]$ of the TTI. The second part $r_b^{TTI}[n]$ of the TTI is first completed with a number of pilot subcarriers in the pilot insertion block 914. A second inverse FFT 916 is then performed (with a length equal to the sum of the lengths of the remaining OFDM symbols). An adder 917 sums together the first and second parts of the TTI, $r_a^{TTI}[n]$ and $r_b^{TTI}[n]$, thus constructing the signal r[n] to be transmitted 900. The signal r[n] arrives 900' at an OFDM receiver 702, through the air interface 90, after suffering the impairments from the air interface 90. At the OFDM receiver 702, the first OFDM symbol is detected 921 by exploiting the presence of the cyclic prefix. The OFDM receiver 702 performs a FFT of the first OFDM symbol after correcting the CFO and discarding the CP, in order to estimate the channel frequency response by means of the pilot subcarriers. ISI cancellation is performed 922 from the remaining part of the TTI according to the process proposed before. The OFDM receiver 702 also removes ICI 923 from the remaining part of the TTI, and finally de-interleaver and FEC decoding operations are performed 924 to deliver the recovered information bits 93.

The proposed embodiments can be implemented as a collection of software elements, hardware elements, firmware elements, or any suitable combination of them.

Note that in this text, the term "comprises" and its derivations (such as "comprising", etc.) should not be understood in an excluding sense, that is, these terms should not be interpreted as excluding the possibility that what is described and defined may include further elements, steps, etc.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method for reducing cyclic prefix overhead while enabling cancellation of inter-symbol and inter-carrier interferences in Orthogonal Frequency-Division Multiplexing (OFDM) wireless networks, wherein information in a set of time-domain complex samples is to be sent by an OFDM transmitter to an OFDM receiver through a wireless channel within a Time Transmission Interval (TTI) the TTI comprising a number $N_{sym}$ of OFDM symbols, the method comprising:

generating, by the OFDM transmitter, a time-domain signal which comprises:

a first part of the TTI for carrying time-domain complex samples ($r_a^{TTI}[n]$) of a first OFDM symbol ($S_0$), where r and a are reference letters that denote part of the received signal TTI ($r^{TTI}[n]$), n is a time index taking values n=0, . . . , $(N_{sym}-1) \cdot N_{OFDM}-1$, and $N_{OFDM}$ is a natural number equal to the number of subcarriers, the first OFDM symbol ($S_0$) being obtained in the time domain through an inverse Fourier Transform of the complex samples to be carried by a number of subcarriers in the frequency domain, the inverse Fourier Transform having a length $N_{OFDM}$, the subcarriers comprising both data subcarriers and pilot subcarriers for channel estimation;

a cyclic prefix (CP) carried in the first part of the TTI and appended to the beginning of the first OFDM symbol ($S_0$), containing a replica of the last samples of the first OFDM symbol ($S_0$), which has a length given by the largest expected delay spread of the wireless channel;

Forward Error Correction encoded information bits to be transmitted, which are pseudo-random interleaved prior to a mapping of the encoded information bits to time-frequency resources;

a second part of the TTI for carrying $(N_{sym}-1) \cdot N_{OFDM}$ time-domain complex samples ($r_b^{TTI}[n]$), where b is a reference letter that denote another part of the received signal TTI ($r^{TTI}[n]$), which samples result from the mapping to time-frequency resources of a set of $(N_{sym}-1) \cdot N_{OFDM}$ complex subcarriers in the frequency domain corresponding to the information to be sent in the second part of the TTI, without appending any cyclic prefix, the set of $(N_{sym}-1) \cdot N_{OFDM}$ complex subcarriers comprising a concatenation of subcarriers corresponding to the remaining OFDM symbols $(S_1, \ldots S_{Nsym-1})$ of the TTI, the concatenated subcarriers comprising both data subcarriers and pilot subcarriers for channel estimation, and the remaining OFDM symbols $(S_1, \ldots S_{Nsym-1})$ being obtained in the time domain by means of an enlarged inverse Fourier Transform with length equal to the number $(N_{sym}-1) \cdot N_{OFDM}$ of the concatenated subcarriers; and concatenating the time-domain complex samples ($r_a^{TTI}[n]$) of the first part of the TTI and the time-domain complex samples ($r_b^{TTI}[n]$) of the second part of the TTI, to be sent by the OFDM transmitter to the OFDM receiver which performs cancellation of inter-symbol and inter-carrier interferences using the time-domain complex samples ($r_a^{TTI}[n]$, $r_b^{TTI}[n]$) of the first part and the second part of the TTI.

2. The method according to claim 1, wherein pilot subcarriers in the second part of the TTI are inserted and arranged in the frequency domain to cover a whole bandwidth (BW) with a frequency separation between pilot subcarriers equal to $(N_{sym}-1)$ times the frequency separation between pilot subcarriers of the subcarriers in the first part of the TTI.

3. The method according to claim 2, wherein the encoded information bits to be transmitted are pseudo-random interleaved by writing input information bits to elements of a rectangular matrix by rows, and reading the output information bits by columns after reordering the columns of the matrix according to a pseudo-random pattern.

4. The method according to claim 3, further comprising reservation of guard bands in the frequency domain before and after the subcarriers corresponding to the information to be transmitted in the second part of the TTI, the guard bands comprising a number of null subcarriers equal to $(N_{sym}-1)$ times a number of guard subcarriers reserved in the first part of the TTI.

5. The method according to claim 4, further comprising recovering information contained in a current TTI by the OFDM receiver performing the following steps:

detecting the first OFDM symbol ($S_0$) by separating time-domain complex samples ($r_a^{TTI}[n]$) of the first part of the current TTI, from the appended cyclic prefix (CP) and from the remaining time-domain complex samples ($r_b^{TTI}[n]$) of the second part of the current TTI;

estimating a carrier frequency offset, CFO, using the detected first OFDM symbol ($S_0$) and the appended cyclic prefix (CP);

compensating the CFO in both the first part and the second part of the TTI;

estimating the channel frequency response (H[f]) in the detected first OFDM symbol ($S_0$);

recovering information in the detected first OFDM symbol ($S_0$) through channel equalization and symbol decoding;

reconstructing a time-domain transmitted signal $s_a^{TTI}[n]$ corresponding to the detected first OFDM symbol ($S_0$) by applying an inverse Fourier transform of the recovered information with length $N_{OFDM}$;

obtaining the channel impulse response, CIR, by performing an inverse Fourier Transform of the channel frequency response (H[f]) estimated in the first OFDM symbol, and identifying a number of CIR taps, the CIR being written as:

$$h[n] = \sum_{j=0}^{N_{taps}-1} a_j \delta[n - \tau_j]$$

where h[n] denotes the CIR in time-domain, $N_{taps}$ denotes the number of identified CIR taps, $a_j$ is a complex amplitude of the j-th tap, $\tau_j$ is a discrete delay associated to the j-th tap, and $\delta(\cdot)$ represents the discrete delta function;

removing inter-symbol interference, ISI, from the remaining time-domain complex samples ($r_b^{TTI}[n]$) of the second part of the current TTI by means of the following equation:

$$r_{b,ISI}^{TTI}[n] = r_b^{TTI}[n] - \sum_{j=0}^{N_{taps}-1} a_j \tilde{s}_a^{TTI}[n - \tau_j + N_{OFDM}],$$

where $r_{b,ISI}^{TTI}[n]$ denotes a signal of the second part of the current TTI after ISI removal, n is a time index taking values $n=0, \ldots, (N_{sym}-1) \cdot N_{OFDM}-1$, and $\tilde{s}_a[n]$ is equal to $s_a[n]$ for $0 \leq n < N_{OFDM}$ and zero outside:

$$\tilde{s}_a^{TTI}[n] \equiv \begin{cases} s_a^{TTI}[n], & 0 \leq n \leq N_{OFDM} \\ 0, & \text{outside} \end{cases};$$

removing inter-carrier interference from the remaining time-domain complex samples ($r_a^{TTI}[n]$) of the second part of the current TTI by performing the following steps:

performing a Fourier transform of a received signal $r_a^{TTI+1}[n]$ in a first part of a subsequent TTI, which is next to the current TTI and comprises a first OFDM symbol corresponding to the received signal $r_a^{TTI+1}[n]$, and estimating a channel frequency response (H[f]) after discarding a CP appended in the first part of the subsequent TTI;

recovering transmitted information from the first OFDM symbol of the received signal $r_a^{TTI+1}[n]$ in the subsequent TTI by channel equalization and symbol decoding;

reconstructing a subsequent time-domain transmitted signal $s_a^{TTI+1}[n]$ corresponding to the first OFDM symbol of the received signal $r_a^{TTI+1}[n]$ in the subsequent TTI by applying an inverse Fourier Transform of the recovered information with length $N_{OFDM}$;

removing inter-carrier interference, ICI from the second part of the current TTI by means of the following equation:

$$r_{b,ISI,ICI}^{TTI}[n] = r_{b,ISI}^{TTI}[n] + r_a^{TTI+1}[n] - \sum_{j=0}^{N'_{taps}-1} a'_j \tilde{s}_a^{TTI+1}[N_{OFDM} - N_{CP} + n - \tau'_j],$$

where $r_{b,ISI,ICI}^{TTI}[n]$ denotes a received signal in the second part of the current TTI after removing the inter-carrier and inter-symbol interferences, n=0, ..., $(N_{sym}-1) \cdot N_{OFDM}-1$, $N'_{taps}$ denotes the number of CIR taps in the first OFDM symbol of the subsequent TTI, $a'_j$ is a complex amplitude of the j-th tap, $\tau'_j$ is a discrete delay associated to the j-th tap, and $$\tilde{s}_a^{TTI+1}[n] \equiv \begin{cases} s_a^{TTI+1}[n], & N_{OFDM} - N_{CP} \leq n < N_{OFDM} \\ 0, & \text{outside} \end{cases};$$

performing channel estimation, channel equalization and symbol decoding in the second part of the current TTI after removing the inter-carrier and inter-symbol interferences; and FEC decoding and de-interleaving of the complex symbols to obtain the information contained in the current TTI.

6. The method according to claim 5, wherein identifying the number of CIR taps $N_{taps}$ in the current TTI and the number of CIR taps $N'_{taps}$ of the subsequent TTI by the OFDM receiver comprises a comparison of the absolute CIR amplitude with a threshold to discard radio channel components being below the threshold.

7. The method according to claim 6, wherein the OFDM wireless network is a Long Term Evolution wireless network.

8. The method according to claim 2, further comprising reservation of guard bands in the frequency domain before and after the subcarriers corresponding to the information to be transmitted in the second part of the TTI, the guard bands comprising a number of null subcarriers equal to $(N_{sym}-1)$ times a number of guard subcarriers reserved in the first part of the TTI.

9. The method according to claim 1, wherein the encoded information bits to be transmitted are pseudo-random interleaved by writing input information bits to elements of a rectangular matrix by rows, and reading the output information bits by columns after reordering the columns of the matrix according to a pseudo-random pattern.

10. The method according to claim 1, further comprising reservation of guard bands in the frequency domain before and after the subcarriers corresponding to the information to be transmitted in the second part of the TTI, the guard bands comprising a number of null subcarriers equal to $(N_{sym}-1)$ times a number of guard subcarriers reserved in the first part of the TTI.

11. The method according to claim 1, further comprising recovering information contained in a current TTI by the OFDM receiver performing the following steps:
   detecting the first OFDM symbol ($S_0$) by separating time-domain complex samples ($r_a^{TTI}[n]$) of the first part of the current TTI, from the appended cyclic prefix (CP) and from the remaining time-domain complex samples ($r_b^{TTI}[n]$) of the second part of the current TTI;
   estimating a carrier frequency offset, CFO, using the detected first OFDM symbol ($S_0$) and the appended cyclic prefix (CP);
   compensating the CFO in both the first part and the second part of the TTI;
   estimating the channel frequency response (H[f]) in the detected first OFDM symbol ($S_0$);
   recovering information in the detected first OFDM symbol ($S_0$) through channel equalization and symbol decoding;
   reconstructing a time-domain transmitted signal $s_a^{TTI}[n]$ corresponding to the detected first OFDM symbol ($S_0$) by applying an inverse Fourier transform of the recovered information with length $N_{OFDM}$;
   obtaining the channel impulse response, CIR, by performing an inverse Fourier Transform of the channel frequency response (H[f]) estimated in the first OFDM symbol, and identifying a number of CIR taps, the CIR being written as:

$$h[n] = \sum_{j=0}^{N_{taps}-1} a_j \delta[n-\tau_j]$$

where h[n] denotes the CIR in time-domain, $N_{taps}$ denotes the number of identified CIR taps, $a_j$ is a complex amplitude of the j-th tap, $\tau_j$ is a discrete delay associated to the j-th tap, and $\delta(\cdot)$ represents the discrete delta function;

removing inter-symbol interference, ISI, from the remaining time-domain complex samples ($r_b^{TTI}[n]$) of the second part of the current TTI by means of the following equation:

$$r_{b,ISI}^{TTI}[n] = r_b^{TTI}[n] - \sum_{j=0}^{N_{taps}-1} a_j \tilde{s}_a^{TTI}[n-\tau_j + N_{OFDM}],$$

where $r_{b,ISI}^{TTI}[n]$ denotes a signal of the second part of the current TTI after ISI removal, n is the time index taking values n=$(N_{sym}-1) \cdot N_{OFDM}-1$, and $\tilde{s}_a[n]$ is equal to $s_a[n]$ for $0 \leq n < N_{OFDM}$ and zero outside:

$$\tilde{s}_a^{TTI}[n] \equiv \begin{cases} s_a^{TTI}[n], & 0 \leq n \leq N_{OFDM} \\ 0, & \text{outside} \end{cases};$$

removing inter-carrier interference from the remaining time-domain complex samples ($r_b^{TTI}[n]$) of the second part of the current TTI by performing the following steps:
   performing a Fourier transform of a received signal $r_a^{TTI+1}[n]$ in a first part of a subsequent TTI, which is next to the current TTI and comprises a first OFDM symbol corresponding to the received signal $r_a^{TTI+1}[n]$, and estimating a channel frequency response (H[f]) after discarding a CP appended in the first part of the subsequent TTI;
   recovering transmitted information from the first OFDM symbol of the received signal $r_a^{TTI+1}[n]$ in the subsequent TTI by channel equalization and symbol decoding;
   reconstructing a subsequent time-domain transmitted signal $s_a^{TTI+1}[n]$ corresponding to the first OFDM symbol of the received signal $r_a^{TTI+1}[n]$ in the subsequent TTI by applying an inverse Fourier Transform of the recovered information with length $N_{OFDM}$;
   removing inter-carrier interference, ICI from the second part of the current TTI by means of the following equation:

$$r_{b,ISI,ICI}^{TTI}[n] = r_{b,ISI}^{TTI}[n] + r_a^{TTI+1}[n] - \sum_{j=0}^{N'_{taps}-1} a'_j \tilde{s}_a^{TTI+1}[N_{OFDM} - N_{CP} + n - \tau'_j],$$

where $r_{b,ISI,ICI}^{TTI}[n]$ denotes a received signal in the second part of the current TTI after removing the inter-carrier and inter-symbol interferences, n=0, ..., $(N_{sym}-1)\cdot N_{OFDM}-1$, $N'_{taps}$ denotes the number of CIR taps in the first OFDM symbol of the subsequent TTI, $a'_j$ is a complex amplitude of the j-th tap, $N_{CP}$ denotes the length of the cyclic prefix, $\tau'_j$ is a discrete delay associated to the j-th tap, and $$\tilde{s}_a^{TTI+1}[n] \equiv \begin{cases} s_a^{TTI+1}[n], & N_{OFDM} - N_{CP} \leq n < N_{OFDM} \\ 0, & \text{outside} \end{cases};$$

performing channel estimation, channel equalization and symbol decoding in the second part of the current TTI after removing the inter-carrier and inter-symbol interferences; and FEC decoding and de-interleaving of the complex symbols to obtain the information contained in the current TTI.

12. The method according to claim 11, wherein identifying the number of CIR taps $N_{taps}$ in the current TTI and the number of CIR taps $N'_{taps}$ of the subsequent TTI by the OFDM receiver comprises a comparison of the absolute CIR amplitude with a threshold to discard radio channel components being below the threshold.

13. The method according to claim 1, wherein the OFDM wireless network is a Long Term Evolution wireless network.

14. An Orthogonal Frequency-Division Multiplexing (OFDM) transmitter for reducing cyclic prefix overhead while enabling inter-symbol and inter-carrier interferences cancellation at an OFDM receiver to which the OFDM transmitter sends information within a Time Transmission Interval (TTI) in a set of time-domain complex samples through a wireless channel of an OFDM wireless network, the TTI comprising a number $N_{sym}$ of OFDM symbols, the OFDM transmitter comprising:

a generator of a time-domain signal for generating the time-domain signal comprising a first part of the TTI for carrying time-domain complex samples ($r_a^{TTI}[n]$) of a first OFDM symbol ($S_0$) and a second part of the TTI for carrying $(N_{sym}-1)\cdot N_{OFDM}$ time-domain complex samples ($r_b^{TTI}[n]$), where r, a and b are reference letters that denote parts of the received signal TTI ($r^{TTI}[n]$), n is a time index taking values n=0, ..., $(N_{sym}-1)\cdot N_{OFDM}-1$, and $N_{OFDM}$ is a natural number equal to the number of subcarriers;

an inverse Fourier Transform performer applied to the complex samples to be carried by a number of subcarriers in the frequency domain for obtaining the first OFDM symbol ($S_0$) in the time domain, the inverse Fourier Transform having a length $N_{OFDM}$, the subcarriers comprising both data subcarriers and pilot subcarriers for channel estimation;

a cyclic prefix (CP) adder for appending the cyclic prefix (CP) with a length given by the largest expected delay spread of the wireless channel to the beginning of the first OFDM symbol ($S_0$), to be carried in the first part of the TTI containing a replica of the last samples of said first OFDM symbol ($S_0$);

a Forward Error Correction encoder for encoding information bits to be transmitted;

a pseudo-random interleaver for interleaving the encoded information prior to a mapping of the encoded information bits to time-frequency resources;

means for mapping the second part of the TTI to time-frequency resources to obtain a set of $(N_{sym}-1)\cdot N_{OFDM}$ complex subcarriers in the frequency domain, without appending any cyclic prefix, the set of $(N_{sym}-1)\cdot N_{OFDM}$ complex subcarriers comprising a concatenation of subcarriers corresponding to the remaining OFDM symbols ($S_1, \ldots S_{N_{sym}-1}$) of the TTI, the concatenated subcarriers comprising both data subcarriers and pilot subcarriers for channel estimation;

an enlarged inverse Fourier Transform with length equal to the number $(N_{sym}-1)\cdot N_{OFDM}$ of the concatenated subcarriers for obtaining the remaining OFDM symbols ($S_1, \ldots S_{N_{sym}-1}$) in the time domain; and a concatenator for concatenating the time-domain complex samples ($r_a^{TTI}[n]$) of the first part of the TTI and the time-domain complex samples ($r_b^{TTI}[n]$) of the second part of the TTI, to be sent by the OFDM transmitter to the OFDM receiver which performs cancellation of inter-symbol and inter-carrier interferences using said time-domain complex samples ($r_a^{TTI}[n]$, $r_b^{TTI}[n]$).

15. The OFDM transmitter according to claim 14, further comprising a pilot subcarriers insertion means for inserting pilot subcarriers in the second part of the TTI which are arranged in the frequency domain to cover a whole bandwidth (BW) with a frequency separation between pilot subcarriers equal to $(N_{sym}-1)$ times the frequency separation between pilot subcarriers of the subcarriers in the first part of the TTI.

16. An Orthogonal Frequency-Division Multiplexing (OFDM) receiver for cancelling inter-symbol and inter-carrier interferences in OFDM networks, which receives time-domain complex samples ($r_a^{TTI}[n]$) in a first part of a current Time Transmission Interval (TTI) and remaining time-domain complex samples ($r_b^{TTI}[n]$), where r, a and b are reference letters that denote parts of a received signal TTI ($r^{TTI}[n]$), n is a time index taking values n=0, ..., $(N_{sym}-1)\cdot N_{OFDM}-1$, and $N_{OFDM}$ is a natural number equal to the number of subcarriers, the remaining time-domain complex samples ($r_b^{TTI}[n]$) in a second part of the current TTI, the OFDM receiver comprising:

a symbol detector for detecting a first OFDM symbol ($S_0$) in the first part of the current TTI by separating time-domain complex samples ($r_a^{TTI}[n]$) of the first part of the current TTI, from a cyclic prefix (CP) appended to the beginning of the time-domain complex samples ($r_a^{TTI}[n]$) and from the remaining time-domain complex samples ($r_b^{TTI}[n]$) of the second part of the current TTI;

a carrier frequency offset estimator for estimating the carrier frequency offset, CFO, by using the detected first OFDM symbol ($S_0$) and the appended cyclic prefix (CP);

a carrier frequency offset corrector for compensating the CFO in both the first part and the second part of the TTI;

a channel frequency response estimator for estimating the channel frequency response (H[f]) in the detected first OFDM symbol ($S_0$);

a channel equalizer and symbol decoder for recovering information in the detected first OFDM symbol ($S_0$);

an inverse Fourier transform with length $N_{OFDM}$ for reconstructing a time-domain transmitted signal $s_a^{TTI}[n]$ corresponding to the detected first OFDM symbol ($S_0$);

a channel impulse response estimator for estimating the channel impulse response, CIR, by performing an inverse Fourier Transform of the channel frequency response (H[f]) estimated in the first OFDM symbol, and identifying a number of CIR taps, the CIR being written as $$h[n] = \sum_{j=0}^{N_{taps}-1} a_j \delta[n - \tau_j]$$

where $h[n]$ denotes the CIR in time-domain, $N_{taps}$ denotes the number of identified CIR taps, $a_j$ is a complex amplitude of the j-th tap, $\tau_j$ is a discrete delay associated to the j-th tap, and $\delta(\cdot)$ represents the discrete delta function;

inter-symbol interference cancellation means for removing inter-symbol interference, ISI from the remaining time-domain complex samples ($r_b^{TTI}[n]$) of the second part of the current TTI by means of the following equation:

$$r_{b,ISI}^{TTI}[n] = r_b^{TTI}[n] - \sum_{j=0}^{N_{taps}-1} a_j \tilde{s}_a^{TTI}[n - \tau_j + N_{OFDM}],$$

where $r_{b,ISI}^{TTI}[n]$ denotes a signal of the second part of the current TTI after ISI removal, n is a time index taking values n=0, ..., $(N_{sym}-1) \cdot N_{OFDM}-1$, and $\tilde{s}_a[n]$ is equal to $s_a[n]$ for $0 \le n < N_{OFDM}$ and zero outside:

$$\tilde{s}_a^{TTI}[n] \equiv \begin{cases} s_a^{TTI}[n], & 0 \le n \le N_{OFDM} \\ 0, & \text{outside} \end{cases};$$

inter-carrier interference cancellation means for removing inter-carrier interference from the remaining time-domain complex samples ($r_b^{TTI}[n]$) of the second part of the current TTI by performing the following steps:

performing a Fourier transform of a received signal $r_a^{TTI+1}[n]$ in a first part of a subsequent TTI, which is next to the current TTI and comprises a first OFDM symbol corresponding to the received signal $r_a^{TTI+1}[n]$, and estimating a channel frequency response (H[f]) after discarding a CP appended in the first part of the subsequent TTI;

recovering transmitted information from the first OFDM symbol of the received signal $r_a^{TTI+1}[n]$ in the subsequent TTI by channel equalization and symbol decoding;

reconstructing a subsequent time-domain transmitted signal $s_a^{TTI+1}[n]$ corresponding to the first OFDM symbol of the received signal $r_a^{TTI+1}[n]$ in the subsequent TTI by applying an inverse Fourier Transform of the recovered information with length $N_{OFDM}$;

removing inter-carrier interference, ICI from the second part of the current TTI by means of the following equation:

$$r_{b,ISI,ICI}^{TTI}[n] = r_{b,ISI}^{TTI}[n] + r_a^{TTI+1}[n] - \sum_{j=0}^{N'_{taps}-1} a'_j \tilde{s}_a^{TTI+1}[N_{OFDM} - N_{CP} + n - \tau'_j],$$

where $r_{b,ISI,ICI}^{TTI}[n]$ denotes a received signal in the second part of the current TTI after removing the inter-carrier and inter-symbol interferences, n=0, ..., $(N_{sym}-1) \cdot N_{OFDM}-1$, $N'_{taps}$ denotes the number of CIR taps in the first OFDM symbol of the subsequent TTI, $a'_j$ is a complex amplitude of the j-th tap, $\tau'_j$ is a discrete delay associated to the j-th tap, and $$\tilde{s}_a^{TTI+1}[n] \equiv \begin{cases} s_a^{TTI+1}[n], & N_{OFDM} - N_{CP} \le n < N_{OFDM} \\ 0, & \text{outside} \end{cases};$$

a channel estimator, channel equalizer and symbol decoder for estimating and equalizing a radio channel and decoding the symbols in the second part of the current TTI after removing the inter-carrier and inter-symbol interferences; and a FEC decoder and de-interleaver of the complex symbols to obtain an information block contained in the current TTI.

* * * * *